United States Patent [19]

Fushiya et al.

[11] Patent Number: 4,926,075
[45] Date of Patent: May 15, 1990

[54] ELECTRIC MOTOR BRUSH ASSEMBLY ADAPTABLE TO DIFFERENT STATORS

[75] Inventors: Fusao Fushiya; Kenji Yoshida; Akira Naitoh; Tetsuya Sawa, all of Anjo, Japan

[73] Assignee: Makita Electric Works, Ltd., Anjo, Japan

[21] Appl. No.: 288,073

[22] Filed: Dec. 21, 1988

[30] Foreign Application Priority Data

Dec. 28, 1987 [JP] Japan .................. 62-335233
Dec. 28, 1987 [JP] Japan .................. 62-335234
Jan. 20, 1988 [JP] Japan .................... 63-9791
Feb. 25, 1988 [JP] Japan ................... 63-43231

[51] Int. Cl.⁵ .................. H02K 15/00; H02K 13/10
[52] U.S. Cl. .......................... 310/50; 310/42; 310/71; 310/239; 29/596
[58] Field of Search ............. 310/43, 50, 71, 68 R, 310/77, 239, 242, 42; 29/596

[56] References Cited

U.S. PATENT DOCUMENTS

| | | | |
|---|---|---|---|
| 3,496,394 | 2/1970 | Balcke et al. | 310/239 |
| 4,523,116 | 6/1985 | Dibbern, Jr. et al. | 310/50 |
| 4,593,220 | 6/1986 | Cousins et al. | 310/239 |
| 4,613,781 | 9/1986 | Sanders | 310/239 |
| 4,673,837 | 6/1987 | Gingerich et al. | 310/239 |

FOREIGN PATENT DOCUMENTS 113763 6/1984 Japan .
138338 9/1985 Japan .

Primary Examiner—Patrick R. Salce
Assistant Examiner—D. L. Rebsch
Attorney, Agent, or Firm—Dennison, Meserole, Pollack & Scheiner

[57] ABSTRACT

An electric motor includes a commutator and a brush assembly. The brush assembly includes a pair of brushes, each disposed in operative relation to the commutator, a pair of brush holders each supporting at least one of the brushes, and an assembly base (69, 74) for securing the brush holders thereto. The assembly base includes a base plate of insulating material and at least two severable conductive passages (71, 72) each secured to the base plate. The conductive passages are adapted to supply electric current to the pair of brushes from different directions and drive the electric motor for rotation in either forward or reverse direction when either one of the passages is severed for permitting use of a single brush assembly in different kinds of motors.

18 Claims, 37 Drawing Sheets

ELECTRIC MOTOR BRUSH ASSEMBLY ADAPTABLE TO DIFFERENT STATORS

BACKGROUND OF THE INVENTION

The present invention relates to improvements in electric motors of the type including a commutator and brushes, and more particularly to a structure for such electric motors which permits simple assembling and reliable operation of the electric motors, and a method of manufacturing components therefore. Electric motors according to the present invention are very useful as compact electric motors to be used for power tools or the like.

In conventional assembling of an electric motor including a commutator and brushes, wiring of leads to brushes or stator coils is intricate and, at the same time, apt to cause trouble, so that various techniques have been proposed to eliminate the problems. Such techniques include, for example:

a technique of providing a terminal board to be attached to an end face of a stator to simplify connection between stator coils and leads;

a technique of employing a brush assembly including brushes and a circuit to be connected with the brushes so as to simplify connection between the brushes and the leads; and a technique which is a combination of the above two techniques and employs both of a terminal board and a brush assembly.

These techniques are disclosed, for example, in U.S. Pat. Nos. 3,924,147, 3,979,615, 4,038,573, 4,056,749, 4,071,793, 4,370,579, 4,593,220 and 4,673,837, and Japanese Laid-Open Patent Publication No. 59-113763 and Japanese Laid-Open Utility Model Publication No. 60-138338.

Though the aforementioned techniques have generally been successful in simplifying the manufacture of electric motors of the type including a commutator and brushes, they did have certain drawbacks and disadvantages.

In the technique of employing a conventional brush assembly, two types of brush assemblies are required to manufacture electric motors which are rotatable in both forward and reverse directions, which causes reduction of efficiency of mass production and troublesome storage of brush assemblies.

In a conventional terminal board, sufficient consideration is not given to the connection between the terminal board and ends of stator coils.

For example, the above listed U.S. Pat. Nos. 3,979,615 and 4,038,573 disclose a structure which connects stator coils with a terminal board. The connecting structure includes a box-like contact retaining element or cavity of a terminal board mounted on an end face of a stator, and an end of the stator coils is inserted through a wire inlet of the cavity. Thereafter, when a contact element or terminal is fitted into the cavity, the end is caught in a groove formed in the terminal, and at this time, a portion of the outer insulating jacket of the end is removed by contact with the groove surface to electrically connect the terminal with the end. However, the end can sometimes float, depending on the position of the cavity into which the terminal connected with the end is fitted. Such a floating end of the stator coils may be broken under continuous vibration during operation of a power tool or the like. This must be avoided by all means.

There has not been yet proposed a compact electric motor of the type including a stator having field coils and brake coils in which all connections of the electric motor can be achieved by means of a single brush assembly and a single terminal board connected thereto. In order to achieve such a structure, the brush assembly must incorporate a connecting circuit for brushes, a connecting circuit for field coils, a connecting circuit for brake coils and connecting means for connecting the brushes, field coils and brake coils. Such a brush assembly will become large in size and impossible to be used for a compact motor.

For example, the above listed Japanese Laid-Open Patent Publication No. 59-113763 and Japanese Laid-Open Utility Model Publication No. 60-138338 disclose the structure of an electric motor having field coils and brake coils. This structure includes two terminal boards, one for the field coils and the other for the brake coils disposed on respective sides of the stator.

In the above prior art commutator type electric motor, terminals connected to the ends of the stator coils are provided on both end faces of the stator, so that wiring is required from the respective terminals on both end faces of the stator to the brush assembly and a starting switch or power switch through leads. Space for such wiring must be provided and the leads must be laid in a stable manner. Furthermore, as the brush assembly carrying brushes and other components is to be fixedly assembled in a housing, for example, of a power tool, assembly of such a commutator type electric motor becomes a time-consuming job, thus reducing the productivity of power tools or the like.

SUMMARY OF THE INVENTION

It is, accordingly, an object of the present invention to provide a technique which permits manufacture of two kinds of electric motors rotatable in both forward and reverse directions using a single brush assembly. To achieve the object, the brush assembly of the present invention includes two circuits for supplying electric power to brushes from different directions, each of the circuits being provided with a severable portion. In this manner, the single brush assembly can be used to manufacture an electric motor which is rotatable in the forward or reverse direction by severing the severable portion of either one of the circuits.

It is another object of the present invention to provide a connecting structure between a terminal board and stator coils which may positively fix the ends of the stator coils. This prevents occurance of troubles at the ends of the stator coils.

It is a further object of the present invention to provide a construction which permits manufacture of electric motors of the type including a stator having field coils and brake coils using only a single brush assembly and a single terminal board and, in this connection, to provide a novel method of manufacturing such a brush assembly.

Such a novel method permits complicated connecting circuits to be incorporated in the brush assembly, so that an electric motor can be manufactured by using only such a single brush assembly and a single terminal board. With this construction, wiring of leads can be remarkably simplified and reliability of the motor can be increased.

The present invention will become more fully apparent from the claims and description as it proceeds in connection with the drawings.

DETAILED DESCRIPTION OF THE PREFERRED EMBODIMENTS

Figure 1:
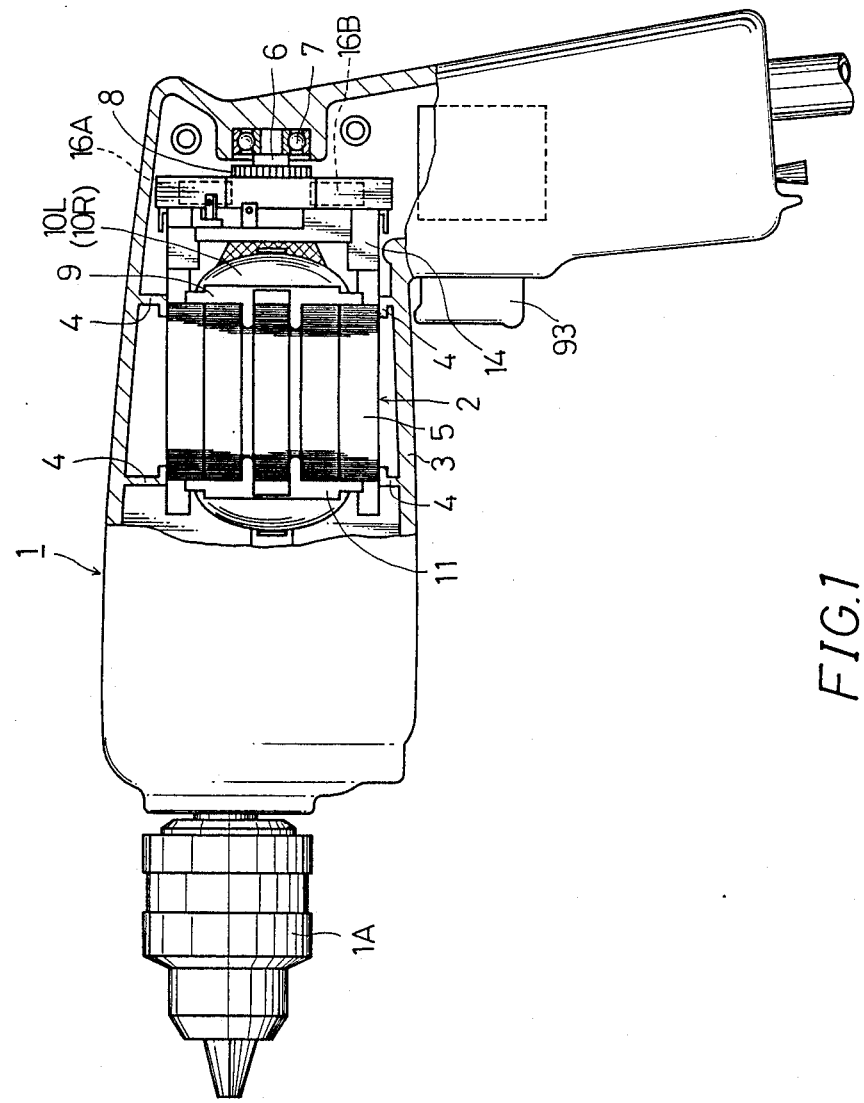
FIG. 1 is a side view, partly in section, of an electric drill incorporating an electric motor of the present invention.

The preferred embodiments of the present invention will now be described with reference to the drawings. For convenience in describing the relative positions of the components, the upper, lower, right and left directions will be referred to as directions as viewed in the drawings.

Referring to FIG. 1, there is shown an electric drill 1 including a commutator type electric motor 2 mounted therein and constructed in accordance with a first embodiment of the invention. The drill 1 includes a housing 3 forming a body thereof and having ribs 4 formed on the inner surface thereof. The motor 2 has a stator and a rotor which are constructed in a conventional manner. The stator has a stator core 5 supported between the ribs 4, and the rotor is mounted on a rotor shaft 6. The rotor shaft 6 has a rear end supported by a bearing 7 and a front end engaged with a rotary element 1A of the drill 1. A commutator 8 is mounted on the rotor shaft 6.

Now the electric motor of the first embodiment will be described with reference to FIGS. 2 to 47. The first embodiment is of the type including brake coils and field coils wound around the stator core 5. The term "brake coil" is used herein to refer to coils for dynamic braking.

Figure 2:
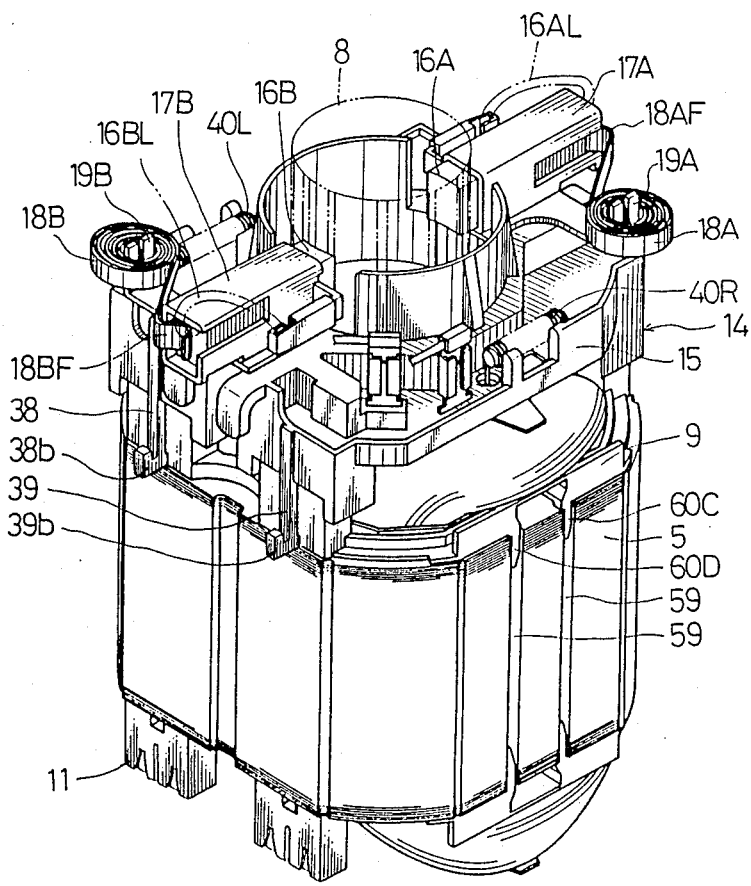
FIG. 2 is a perspective view of a brush assembly constructed in accordance with a first embodiment of the present invention, with the brush assembly fixedly connected to a terminal board which is attached to one end of a stator core.
Figure 14:
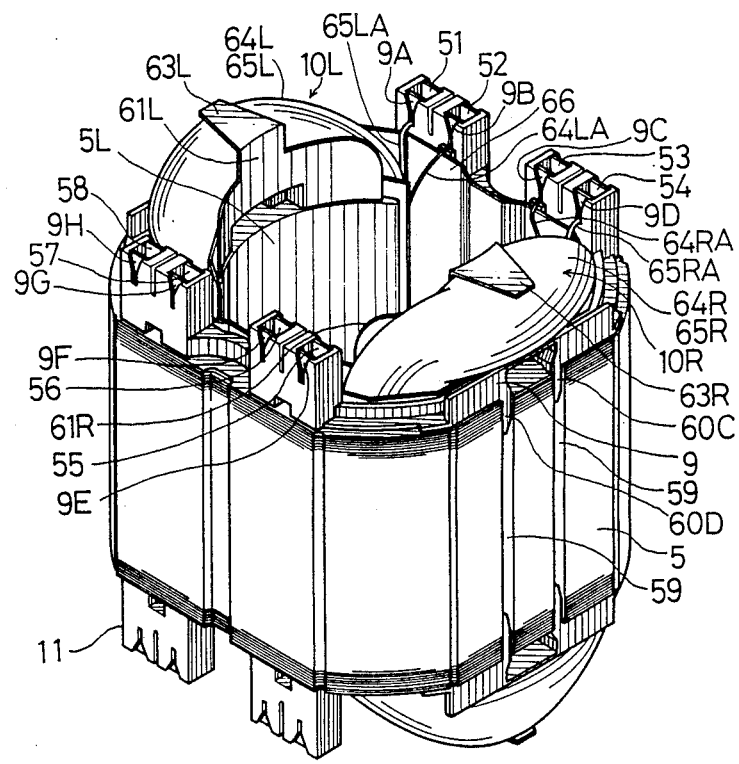
FIG. 14 is a perspective view of the stator core and the terminal board attached to the end face of the stator core showing connection of ends of the stator coils to crimp terminals of the terminal board.

As shown in FIG. 2, a terminal board 9 of resin material is mounted on the upper end face of the stator core 5, serving as an insulating frame for each of stator coils 10L, 10R wound in two separate windings as shown in FIG. 14 and as means for connecting terminals, as well as preventing deformation of the stator coils. A similar terminal board 11 is mounted on the lower end face of the stator core 5, only serving as an insulating frame for the stator coils 10L, 10R and preventing deformation of the coils but carrying no electric connections.

With continuing reference to FIG. 2, a brush assembly 14 is mounted on the terminal board 9 and includes a base plate 15 formed of resin material. The base plate 15 is provided on the upper surface thereof with a pair of brush holders 17A, 17B which support a pair of brushes 16A, 16B, respectively. The brushes 16A, 16B contact the commutator 8 for supplying electric power to the rotor coils of the rotor and include brush leads 16AL, 16BL which are electrically connected to the brush holders 17A, 17B, respectively. The brush holders 17A, 17B are provided with respective brush holder terminals 17AT, 17BT to which the brush leads 16AL, 16BL of the brushes 16A, 16B inserted into the brush holders 17A, 17B are to be connected.

Figure 3:
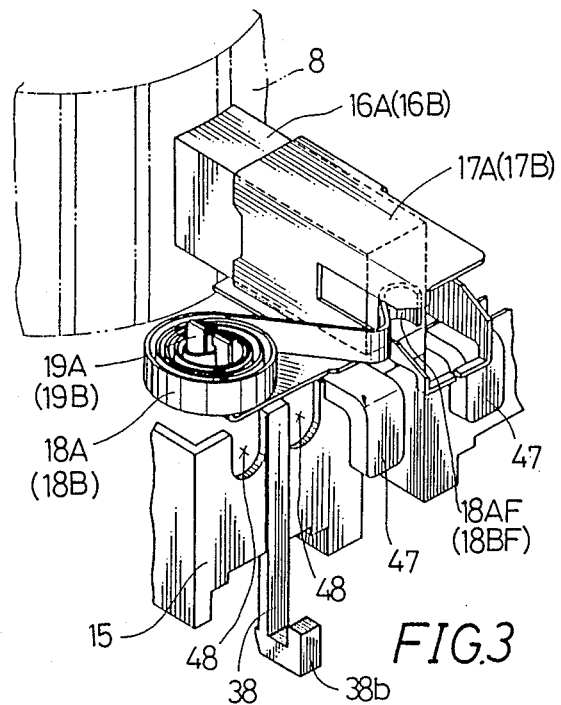
FIG. 3 is an enlarged fragmentary perspective view of a portion of the brush assembly in FIG. 2 showing a brush in pressed contact against a commutator.
Figure 47:
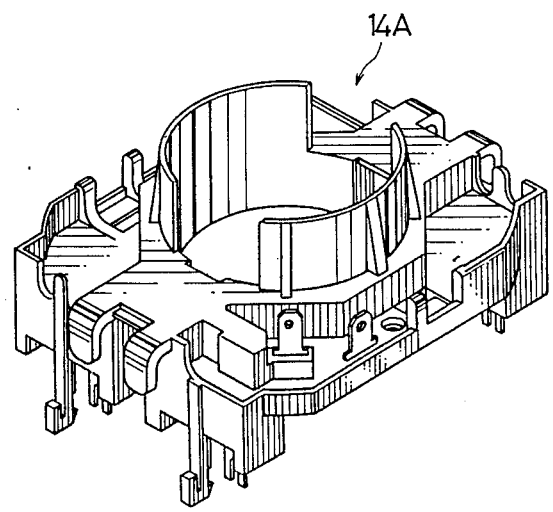
FIG. 47 is a perspective view of a molded assembly base.

A pair of brush springs 18A, 18B in the form of coils formed of a flat spring material are supported on the upper end face of the base plate 15 by brush spring holders 19A, 19B. As best shown in FIG. 3, the brush springs 18A, 18B have distal ends 18AF, 18BF adapted to abut against the rear end faces of the brushes 16A, 16B to urge them towards commutator 8. Thus, the brush assembly 14 is provided with the brushes, brush holders, brush springs and other components. In this regard, a structure carrying such components as shown in FIG. 47 will be called an assembly base 14A.

Figure 4:
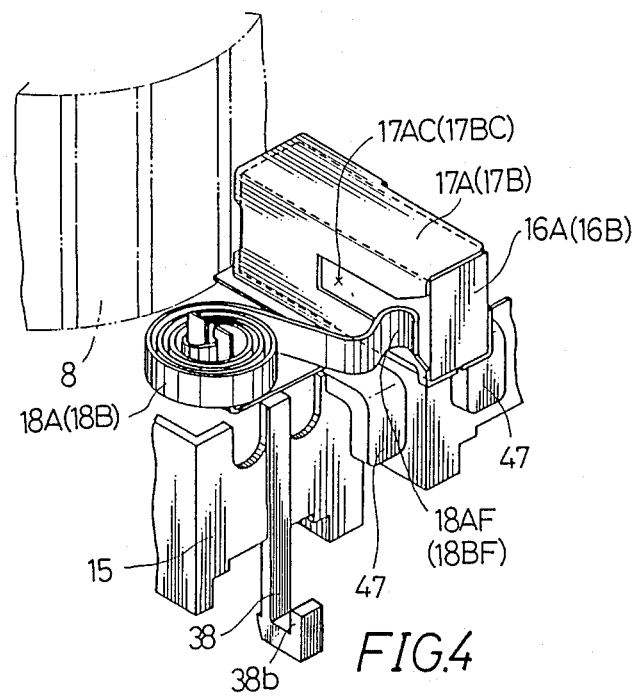
FIG. 4 is a view similar to FIG. 3 showing the brush held away from the commutator.
Figure 5:
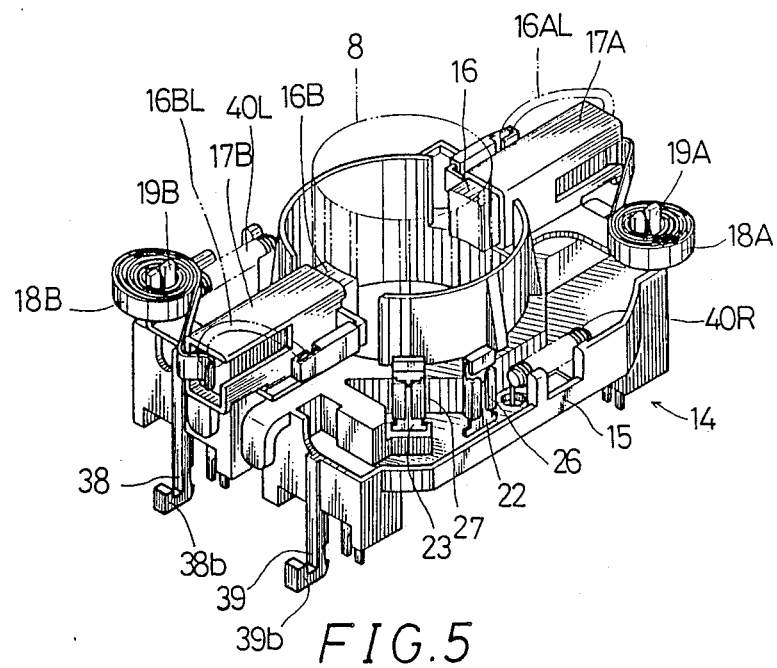
FIG. 5 is a perspective view of the brush assembly shown in FIG. 2.

As will be seen in FIG. 4, the brush springs 18A, 18B are also adapted to hold the brushes 16A, 16B away from the commutator 8 with the distal ends 18AF, 18BF in abutment against the side faces of the brushes 16A, 16B. More specifically, when the distal end 18AF (18BF) of the brush spring 18A (18B) is in abutment against the side face of the brush 16A (16B) through a cutout portion 17AC (17BC) formed in the side face of the brush holder 17A (17B) as shown in FIG. 4, the brush spring 18A (18B) presses the side face of the brush 16A (16B) to urge the brush 16A (16B) against the inner surface of the brush holder 17A (17B) and maintain it in the urged condition. The brush 16A (16B) in this condition can be forced forward from backside by an assembler, until the distal end 18AF (18BF) of the brush spring 18A (18B) comes in abutment against the rear end face of the brush 16A (16B) in place of the side face, and at this time, the brush 16A (16B) comes in contact with the commutator 8, as shown in FIG. 3. In this manner, the brush springs 18A, 18B serve to urge the brushes 16A, 16B against the commutator 8 as well as to hold the brushes 16A, 16B away from the commutator 8. With this construction, in the process of mounting the brush assembly 14 on the terminal board 9 and then inserting the rotor into the stator, the brushes 16A, 16B can be held away from the commutator 8, and when, after insertion of the rotor into the stator, the assembler forces the brushes 16A, 16B from backside, the brush springs 18A, 18B urge the brushes 16A, 16B toward commutator 8, assuring sufficient contact between the brushes 16A, 16B and the commutator 8. In this manner, employment of the brush springs 18A, 18B improves the efficiency of assembling.

Further details of the brush assembly 14 are shown in FIGS. 5, 6, 7 and 8. As shown therein, the brush assembly 14 is provided with fixed male terminals 20, 21, 22, 23 for plug-in connection with female terminals 24, 25, 26, 27 connected to respective ends of leads 24L, 25L, 26L, 27L which are, in turn, connected to a switch 93 or the like of the electric drill 1. The fixed terminals 20, 21, 22, 23 extend upwardly from the base plate 15 and are formed on end portions of conductive plates which will be described later.

The base plate 15 is provided on the lower end face thereof with flat male terminals 28, 29, 30, 31, 32, 33, 34, 35 for plug-in electrical connection with crimp or female terminals 51, 52, 53, 54, 55, 56, 57, 58 provided on the terminal board 9 which will be described later. These male terminals 28 to 35 are formed on end portions of conductive plates which will be described later, and the other portions of the conductive plates are embedded in the resin portion of the base plate 15.

The base plate 15 is also provided with four locking pieces 36, 37, 38, 39 extending downwardly from the lower end face of the base plate 15 and having locking pawls 36a, 37a, 38a, 39a at respective lower ends thereof. As shown in FIG. 2, the locking pawls 36a to 39a are adapted to be engaged with slots formed in the terminal board 9 to positively lock the brush assembly 14 to the terminal board 9. When it is desired to remove the brush assembly 14 from the terminal board 9, detaching hooks 36b, 37b, 38b, 39b extending outwardly from the lower ends of the locking pieces 36 to 39 are pulled outwardly, permitting the locking pawls 36a to 39a to be easily disengaged from the slots.

Figure 6:
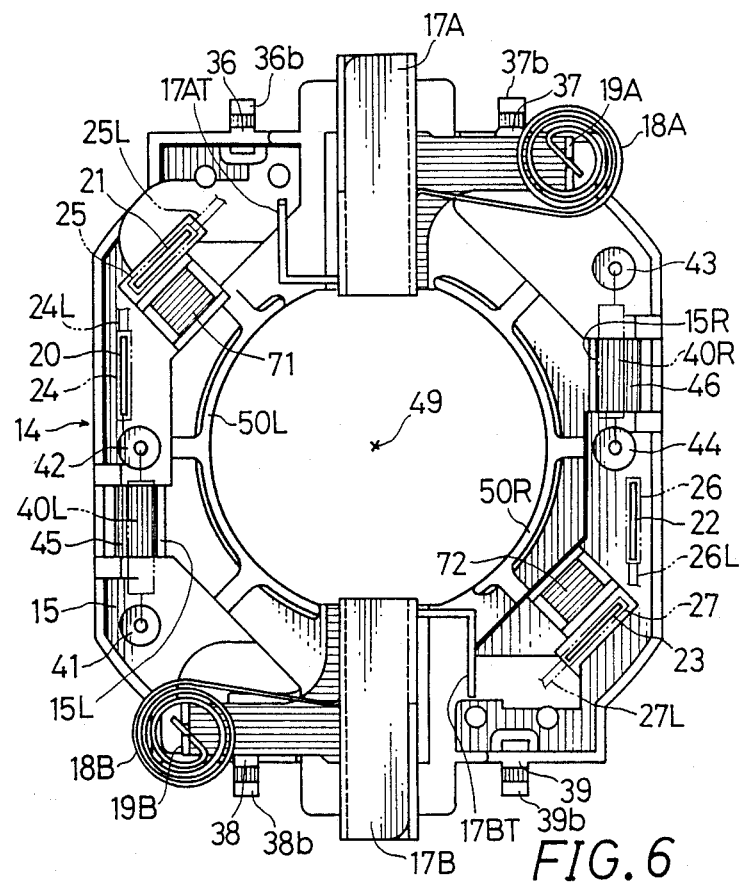
FIG. 6 is a plan view of the brush assembly of FIG. 5.

As shown in FIG. 6, the base plate 15 is further provided on the upper end face thereof with two pairs of terminal holes 41, 42 and 43, 44 to be connected to choke coils 40L, 40R for suppressing noise produced at connections between the commutator 8 and the brushes 16A, 16B. There are shorts across the terminal holes 41, 42 and across the terminal holes 43, 44 caused by the conductive plates which will be described later. Thus, when the choke coils 40L, 40R are connected between the terminal holes 41, 42 and between the terminal holes 43, 44, the conductive plates are severed through severing windows 45, 46, and then the choke coils 40L, 40R are connected to the terminal holes 41, 42 and 43, 44 by soldering or spot welding, so that driving current may flow through the choke coils 40L, 40R to the rotor coils. In addition, the base plate 15 is provided with ribs 15L, 15R to mechanically retain the choke coils 40L, 40R in such a manner that the ribs 15L, 15R may be in contact with the outer surfaces of the choke coils 40L, 40R.

In this embodiment, the brush holders 17A, 17B are electrically and mechanically connected to brush holder mounting portions 69, 74 exposed to the surface of the assembly base 14A which will be described later. In this manner, the brushes 16A, 16B are connected through the leads 16AL, 16BL to the brush holder mounting portions 69, 74 which are, in turn, connected to an electric circuit incorporated in the assembly base 14A.

In a modification, terminals to be connected to the leads 16AL, 16BL may be provided on the brush spring holders 19A, 19B. In this case, the brush spring holders 19A, 19B are electrically and mechanically connected to the brush holder mounting portions 69, 74, and the brush holders 17A, 17B are not required to be connected thereto.

Figure 7:
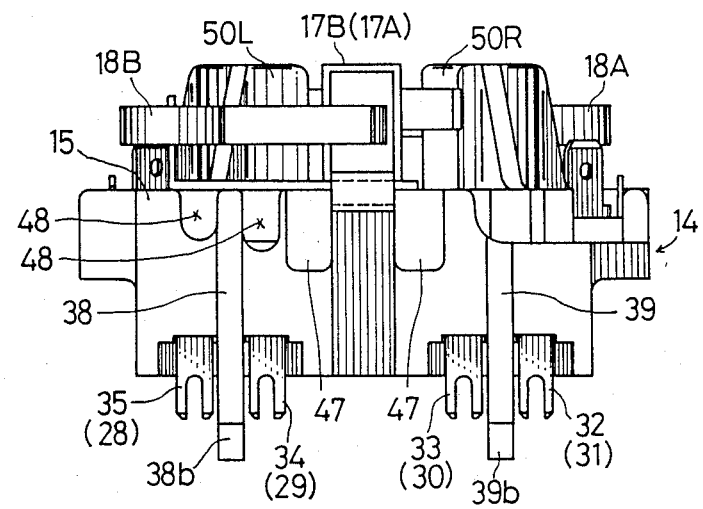
FIG. 7 is an end view of the brush assembly of FIG. 5.
Figure 8:
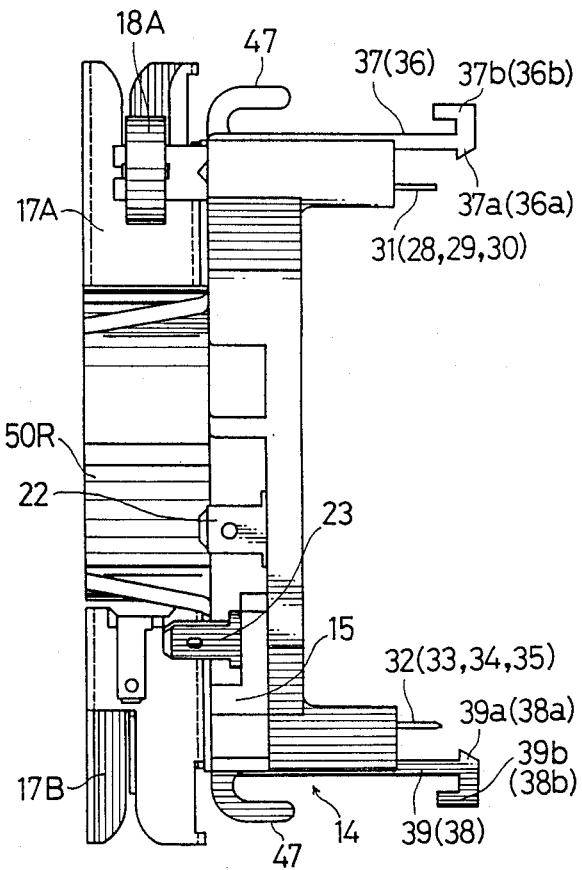
FIG. 8 is a right side view of the brush assembly of FIG. 5.
Figure 9:
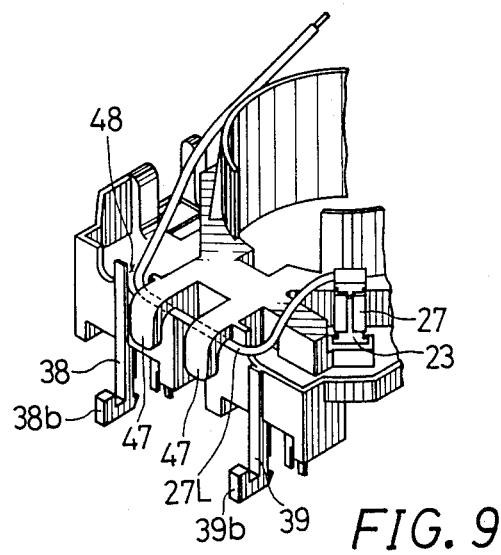
FIG. 9 is an enlarged fragmentary perspective view of a portion of the brush assembly showing how to guide a lead.

As shown in FIG. 7, a plurality of small lead guide members 47 extend downwardly from the upper end face of the base plate 15 so as to guide the leads 24L to 27L connected to the fixed terminals 20 to 23 to extend along the outer periphery of the base plate 15 without projecting outwardly. A plurality of lead guide holes 48 are formed in the outer peripheral portion of the base plate 15 for passing the leads guided by the lead guide members 47 therethrough. FIG. 9 shows, for example, the lead 27L guided by the lead guide members 47 and the lead guide holes 48 and laid in a stable condition.

As shown in FIG. 6, the base plate 15 has a circular aperture 49 for receiving the commutator 8 with a required clearance left therebetween. A pair of isolating plates 50L, 50R are provided in opposing relationship with each other along the boundary edge of the aperture 49 for preventing scattering of carbon powders generated by contact between the rotating commutator 8 and the brushes 16A and 16B and also for preventing contact between several leads and the commutator 8. The opposite surfaces of the isolating plates 50L and 50R are curved to have a radius of curvature corresponding to the diameter of the commutator 8.

Figure 10:
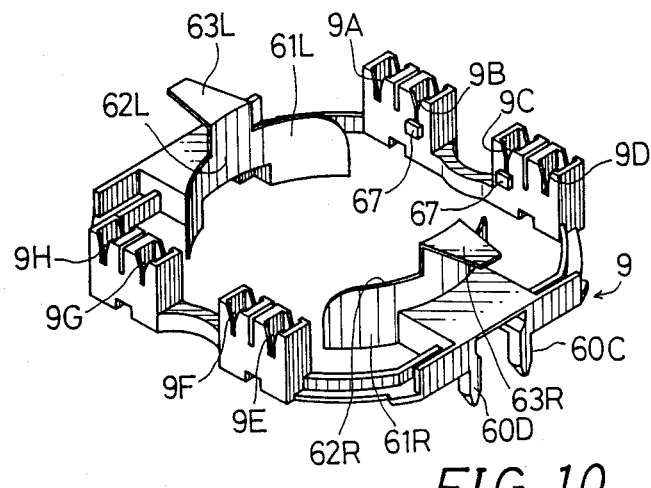
FIG. 10 is a perspective view of the terminal board shown in FIG. 2.
Figure 11:
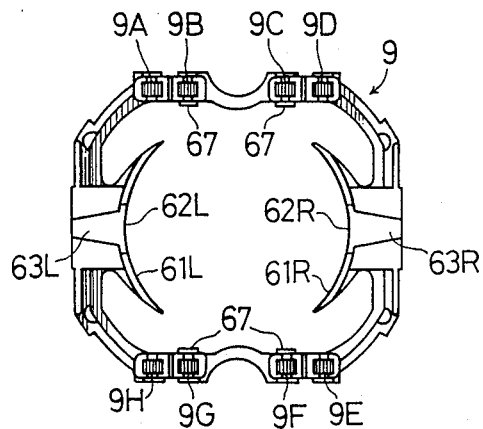
FIG. 11 is a plan view of the terminal board of FIG. 10.
Figure 13:
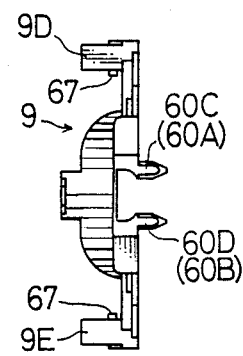
FIG. 13 is a right side view of the terminal board of FIG. 10.
Figure 12:
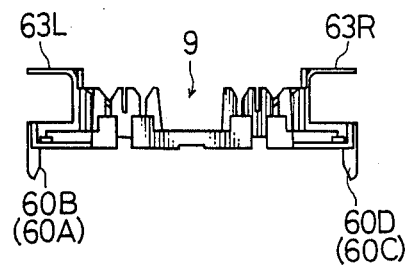
FIG. 12 is an end view of the terminal board of FIG. 10.

The terminal board 9 will now be explained with reference to FIGS. 10, 11, 12, 13 and 14. The terminal board 9 is mounted on the end face of the stator core 5, as previously described, and has integrally formed cavities 9A to 9H for receiving terminals 51, 52, 53, 54, 55, 56, 57, 58 connected with respective ends of the stator coils 10L and 10R (FIG. 14). The terminal board 9 has on the lower end face thereof four retaining legs 60A, 60B, 60C, 60D (FIGS. 12 and 13) to be fitted into a plurality of narrow grooves 59 formed axially in the outer surface of the stator core 5. As best shown in FIG. 10, a pair of coil support frames 61L, 61R are provided in opposing relationship with each other on the upper end face of the terminal board 9 so as to prevent deformation of the stator coils 10L, 10R. The coil support frames 61L, 61R have respective opposite surfaces 62L, 62R curved to have a radius of curvature corresponding to the diameter of the rotor core. The coil support frames 61L, 61R have integrally formed hold-down plates 63L, 63R extending from the top portions of the coil support frames 61L, 61R and adapted to press the upper portions of the stator coils 10L, 10R so as to restrict the upper level thereof.

As shown in FIG. 14, the stator coils are wound in two separate coils 10L, 10R around one magnetic pole 5L of the stator core 5 and the other magnetic pole 5R which is not visible in FIG. 14 but provided in opposing relationship with the one magnetic pole 5L, respectively. The stator coil 10L includes a brake coil 64L having a starting end 64LA connected to the terminal 52 of the terminal board 9 and a terminating end 64LB (not shown) connected to the terminal 57. The terminals 52 and 57 are fixedly received in the cavities 9B and 9G, respectively. In the same way, the other terminals 51, 53, 54, 55, 56, 58 are fixedly received in the cavities 9A, 9C, 9D, 9E, 9F, 9H, respectively. The stator coil 10L further includes a field coil 65L having a starting end 65LA connected to the terminal 51 of the terminal board 9 and a terminating end 65LB (not shown) connected to the terminal 58. The other stator coil 10R includes a brake coil 64R having a starting end 64RA connected to the terminal 53 of the terminal board 9 and terminating end 64RB (not shown) connected to the terminal 56. The stator coil 10R further includes a field coil 65R having a starting end 65RA connected to the terminal 54 of the terminal board 9 and a terminating end 65RB (not shown) connected to the terminal 55.

A flexible insulating sheet 66 of resin material is interposed between the stator coils 10L, 10R and the stator core 5 so as to prevent direct contact between the stator coils 10L, 10R and the stator core 5, when the stator coils 10L and 10R are wound around the corresponding magnetic poles 5L and 5R of the stator core 5 opposite to each other.

Figure 15:
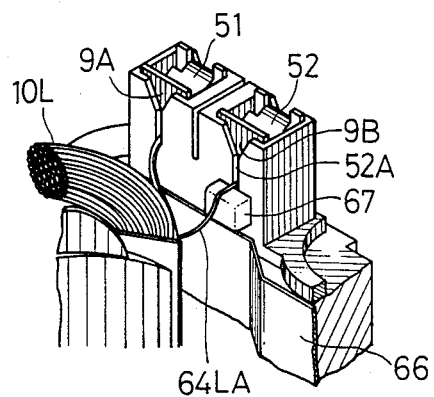
FIG. 15 is an enlarged fragmentary view of FIG. 14.

The brake coils 64L, 64R are small in diameter in comparison with the field coils 65L, 65R, and if the ends 64LA, 64LB, 64RA, 64RB of the brake coils 64L, 64R are held in pressed contact against the edge of the insulating sheet 66, application of continuous vibration produced by rotation of the electric motor 2 may cause the contacting portion of the outer insulating jacket to be removed from the wire, and in some cases, the wire may be broken due to friction. In order to prevent such faults, the terminals of the terminal board 9 are provided with small projections 67. FIG. 15 shows an example of the small projections 67 provided for the terminal 52. The small projection 67 is provided below a lead inlet 52A formed in the cavity 9B for receiving the terminal 52 to be connected to the end 64LA of the brake coil 64L, so that the end 64LA extends along the surface of the small projection 67 and is inserted through the lead inlet 52A. Then, the terminal 52 is pressed into the cavity 9B to come in pressed contact with the end 64LA, so that the end 64LA may be isolated from the edge of the insulating sheet 66 to be kept free from vibration which may be transmitted therefrom. In the same manner as shown in FIG. 15 in which the small projection 67 is provided for the cavity 9B and the terminal 52, the respective small projections 67 are provided for the cavity 9G for receiving the terminal 57 to be connected to the end 64LB of the brake coils 64L, for the cavity 9C for receiving the terminal 53 to be connected to the end 64RA of the brake coils 64R, and for the cavity 9F for receiving the terminal 56 to be connected to the end 64RB of the brake coil 64R. In addition to the above cavities 9B, 9C, 9F, 9G, the cavities 9A, 9D, 9E, 9H for receiving the terminals 51, 54, 55, 58 to be connected to the respective ends of the field coils 65L and 65R may be provided below the lead inlets thereof with similar small projections.

Figure 16:
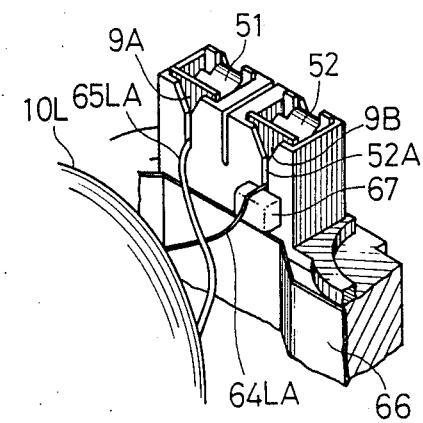
FIG. 16 is a view similar to FIG. 15 showing relative arrangement of ends of field coils and brake coils.

FIG. 16 shows that the end 64LA of the brake coil 64L connected to the terminal 52 is pressed and fixed by the end 65LA of the field coil 65L extending diagonally upward across the end 64LA, and thus laid in a stable manner.

As shown in FIG. 16, the end 64LA of the brake coil 64L is connected to the terminal 52 in such a manner as to be held slightly away from the insulating sheet 66 by the small projection 67, and the end 65LA of the field coil 65L is connected to the terminal 51, crossing on the end 64LA having a smaller diameter than the end 65LA to press the end 64LA, so that the end 64LA can be connected to the terminal 52 under sufficient pressing force given by the end 65LA. In this manner, the brake coil 64L can be prevented from deformation due to straying of the end 64LA from the brake coil 64L, and also the field coil 65L can be prevented from deformation by the diagonally upward extension of the end 65LA toward the terminal 51. The positional relationships between the ends 64LB and 65LB, between the ends 64RA and 65RA and between the ends 64RB and 65RB are the same as the positional relationship between the end 64LA of the brake coil 64L and the end 65LA of the field coil 65L in FIG. 16.

Figure 17:
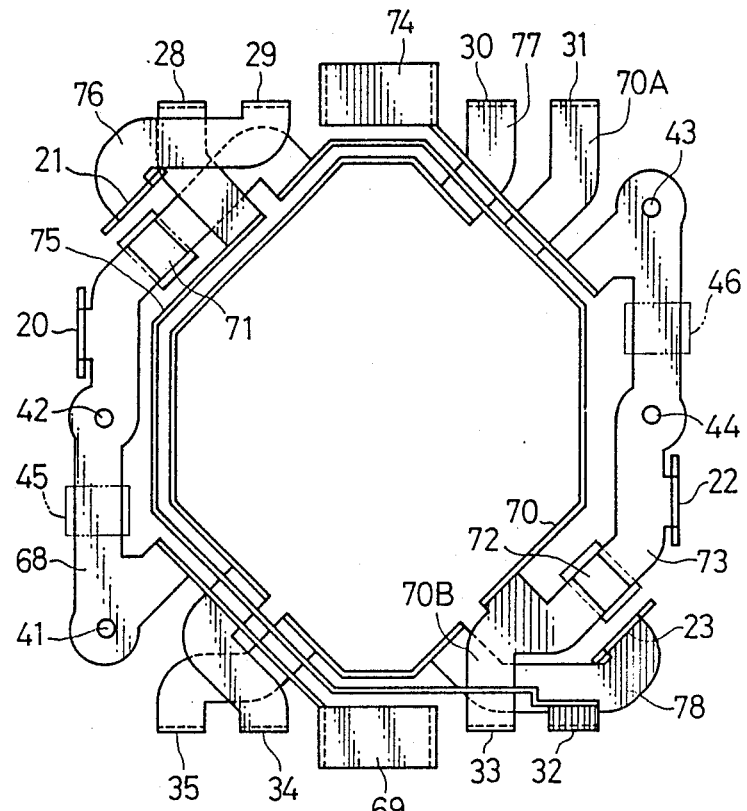
FIG. 17 is a plan view showing arrangement of conductive plates in the brush assembly.
Figure 18:
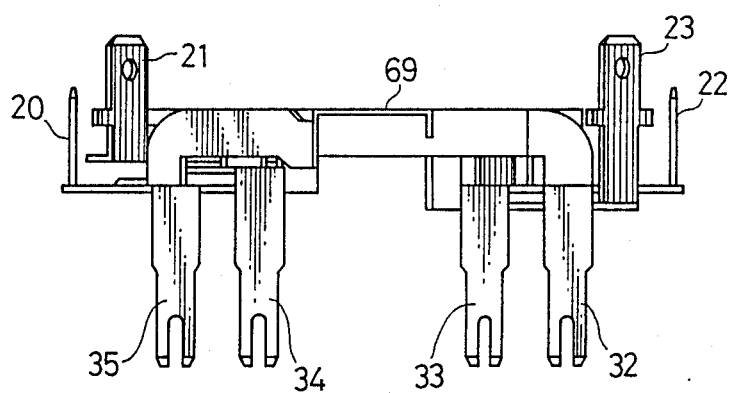
FIG. 18 is an end view of FIG. 17.
Figure 19:
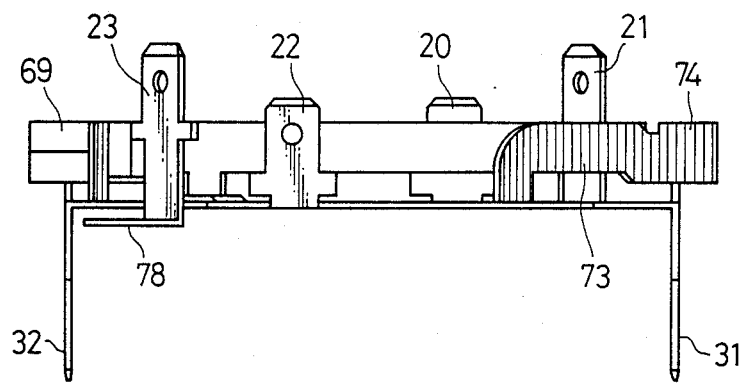
FIG. 19 is a right side view of FIG. 18.
Figure 20:
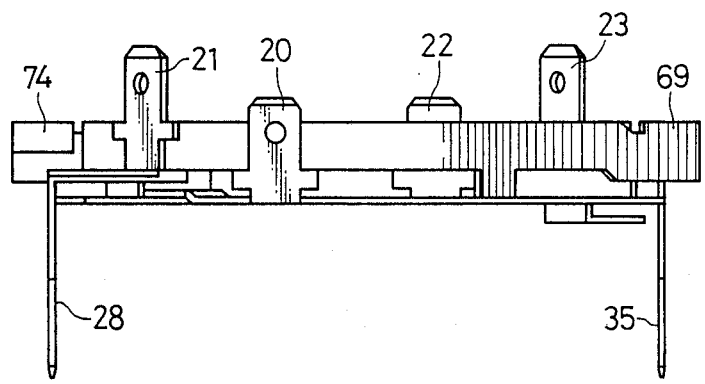
FIG. 20 is a left side view of FIG. 18.
Figure 21:
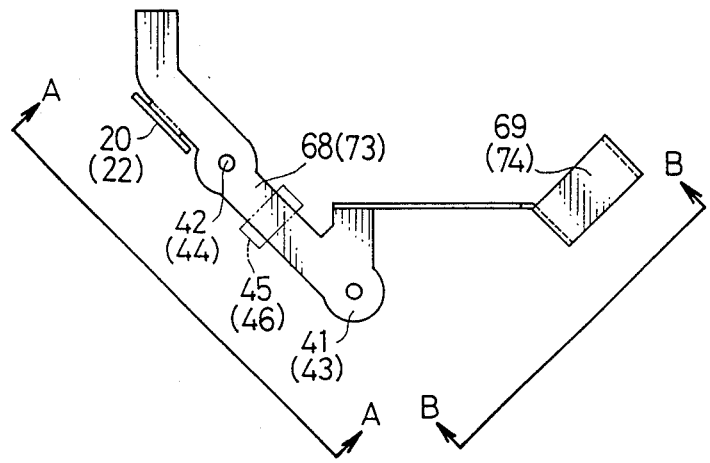
FIG. 21 is a plan view of the conductive plate 68(73) shown in FIG. 17.
Figures 22, 23:
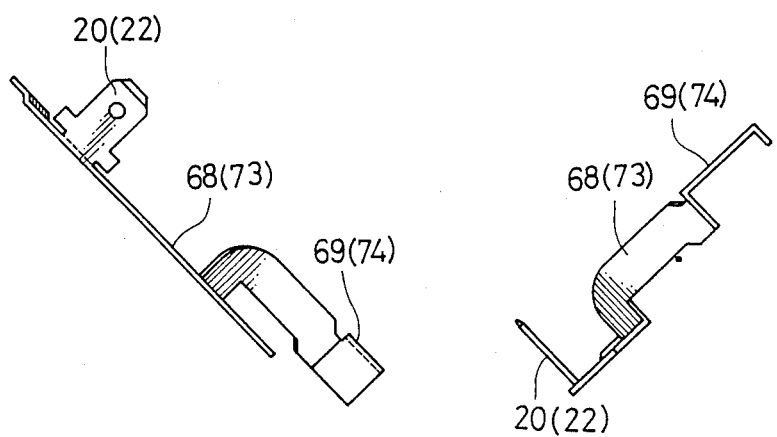
FIG. 22 is a view of the conductive plate 68(73) when looking in the direction of arrows A—A in FIG. 21.
FIG. 23 is a view of the conductive plate 68(73) when looking in the direction of arrows B—B in FIG. 21.
Figure 24:
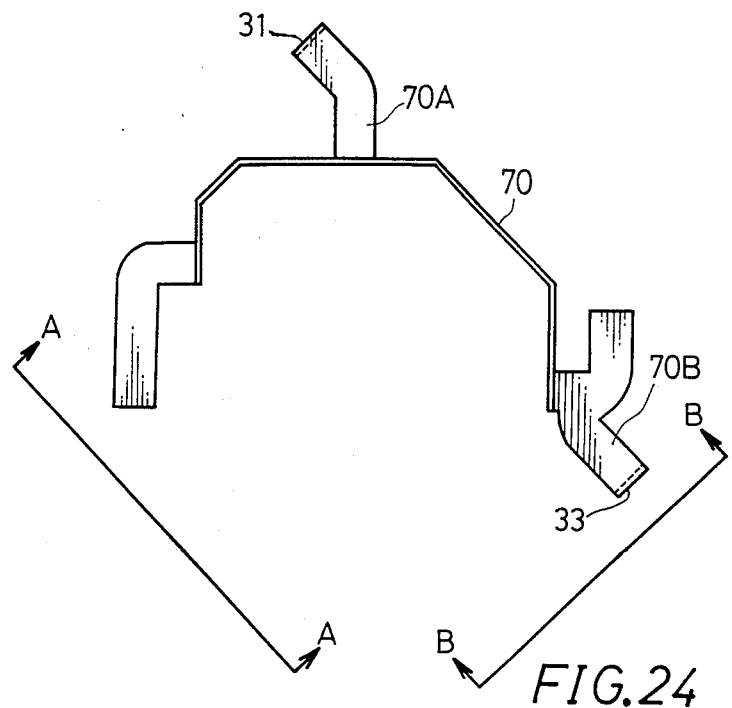
FIG. 24 is a plan view of the conductive plate 70 shown in FIG. 17.
Figure 25:
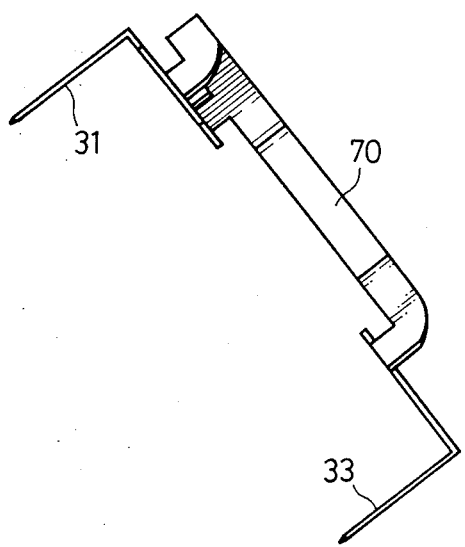
FIG. 25 is a view of the conductive plate 70 when looking in the direction of arrows A—A in FIG. 24.
Figure 26:
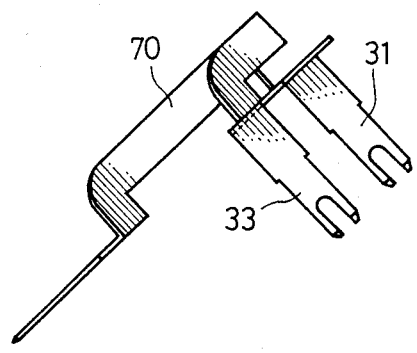
FIG. 26 is a view of the conductive plate 70 when looking in the direction of arrows B—B in FIG. 24.
Figure 27:
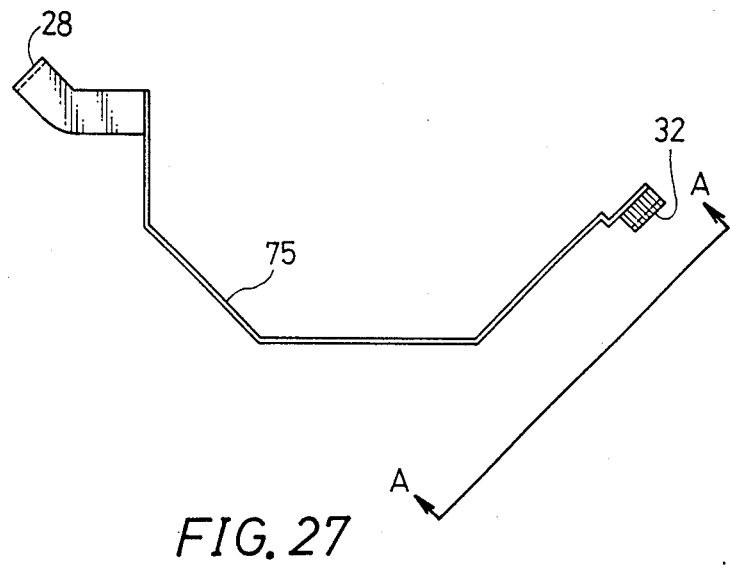
FIG. 27 is a plan view of the conductive plate 75 in FIG. 17.
Figure 28:
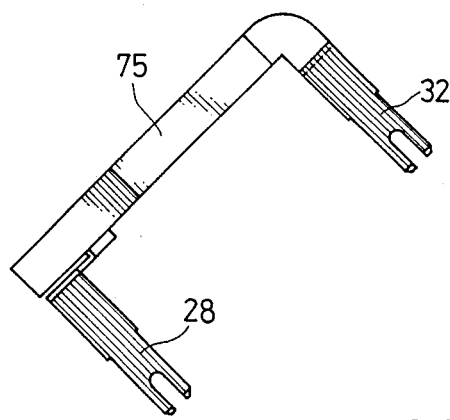
FIG. 28 is a view of the conductive plate 75 when looking in the direction of arrows A—A in FIG. 27.
Figure 29:
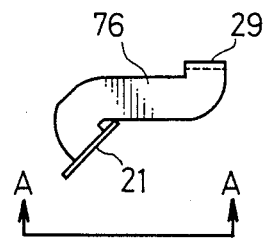
FIG. 29 is a plan view of the conductive plate 76 in FIG. 17.
Figure 30:
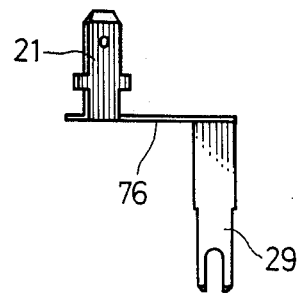
FIG. 30 is a view of the conductive plate 76 when looking in the direction of arrows A—A in FIG. 29.
Figure 31:
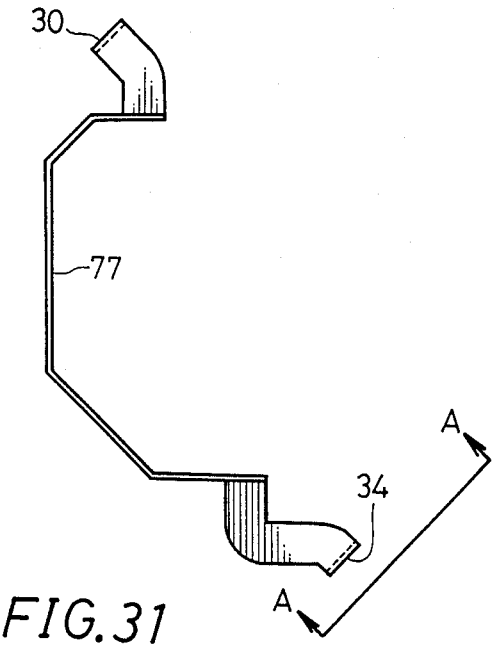
FIG. 31 is a plan view of the conductive plate 77 in FIG. 17.
Figure 32:
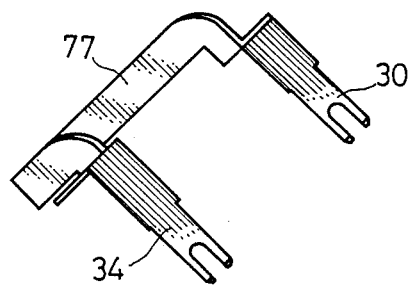
FIG. 32 is a view of the conductive plate 77 when looking in the direction of arrows A—A in FIG. 31.
Figure 33:
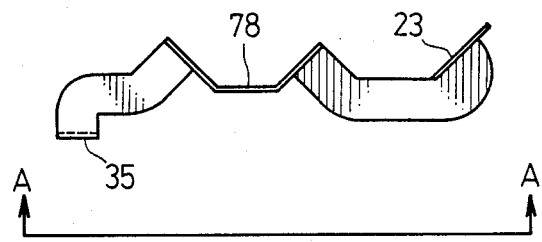
FIG. 33 is a plan view of the conductive plate 78 in FIG. 17.
Figure 34:
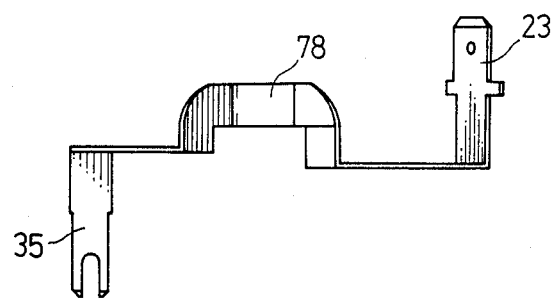
FIG. 34 is a view of the conductive plate 78 when looking in the direction of arrows A—A in FIG. 33.

The arrangement of conductive plates embedded in the base plate 15 will now be described with reference to FIGS. 17, 18, 19 and 20. FIG. 17 is a plan view of the arrangement of the conductive plates provided with the fixed terminals 20 to 23 and the terminals 28 to 35 and embedded in the base plate 15 with required spaces left between the respective conductive plates in accordance with their electrical insulating characteristics. FIG. 18 is an end view of FIG. 17; FIG. 19 is a right side view of FIG. 17; and FIG. 20 is a left side view of FIG. 17.

As will be seen in FIGS. 17 to 20, the arrangement is composed of conductive plates 68, 70, 73, 75, 76, 77 and 78. The conductive plate 68 has an intermediate portion formed with the fixed terminal 20 and the terminal holes 41, 42, one end portion constituting a brush holder mounting portion 69 to which the brush holder 17B is electrically and mechanically connected, and the other end portion to be connected in layers with one end portion of the conductive plate 70 to form a junction 71. The other end portion of the conductive plate 70 is connected in layers with one end portion of the conductive plate 73 to form a junction 72. The conductive plate 70 includes a branch portion 70A having the terminal 31 at the distal end thereof and another branch portion 70B having the terminal 33 at the distal end thereof.

The conductive plate 73 is of the same configuration as the conductive plate 68 and disposed symmetrically with respect thereto. The conductive plate 73 has an intermediate portion formed with the fixed terminal 22 and the terminal holes 43, 44, the one end portion connected with the other end portion of the conductive plate 70 at the junction 72, as previously described, and the other end portion constituting a brush holder mounting portion 74 to which the brush holder 17A is electrically and mechanically connected.

The conductive plate 75 has one end portion formed with the terminal 28 and the other end portion formed with the terminal 32. The conductive plate 76 has one end portion formed with the terminal 29 and the other end portion formed with the fixed terminal 21. The conductive plate 77 has one end portion formed with the terminal 30 and the other end portion formed with the terminal 34. The conductive plate 78 has one end portion formed with the fixed terminal 23 and the other end portion formed with the terminal 35.

As shown in FIG. 6 (and by dashed lines in FIG. 17), the junctions 71 and 72 are exposed through windows formed in the surface of the base plate 15, so that they can be spot welded or severed from outside. In this manner, the direction of rotation of the electric motor 2 can be determined by severing one of the junctions 71 and 72 and spot welding the other. This operation will be hereinafter described in detail with reference to the electric circuit diagram. It will be noted that the positions corresponding to the severing windows 45, 46 and the windows for the junctions 71 and 72 in FIG. 6 are shown in two-dot chain lines in FIG. 17.

For better understanding of the general arrangement of the conductive plates 68, 70, 73, 75, 76, 77 and 78, the respective conductive plates are shown separately in FIGS. 21 to 34.

Figure 35:
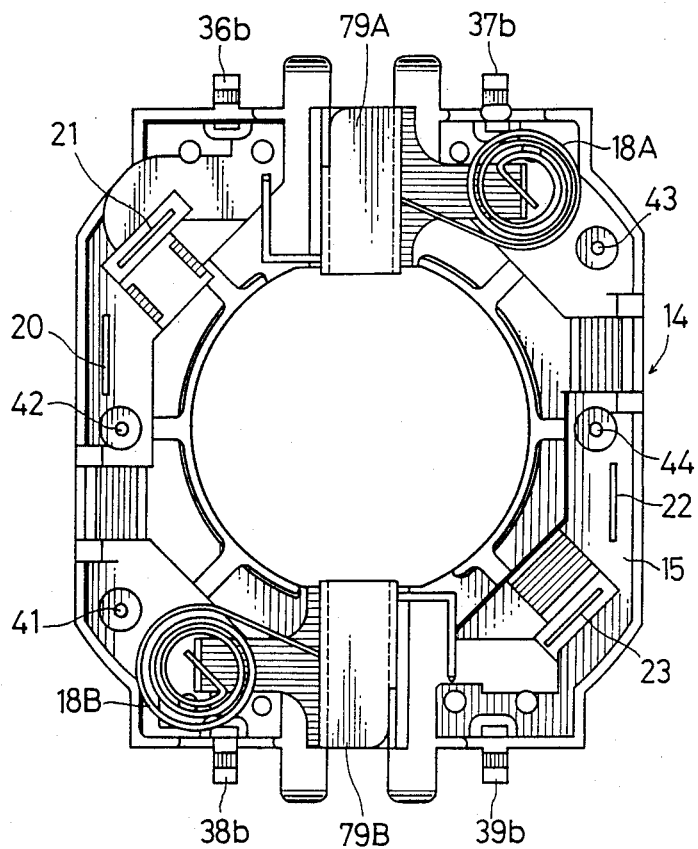
FIG. 35 is a plan view of the brush assembly carrying shorter brushes.

FIG. 35 shows a pair of brush holders 79A, 79B of a length shorter than the brush holders 17A, 17B shown in FIG. 6 which are mounted on the brush holder mounting portions of the base plate 15. In this manner, various sizes of brushes or brush holders may be mounted on the base plate 15 according to the present invention.

Figure 36:
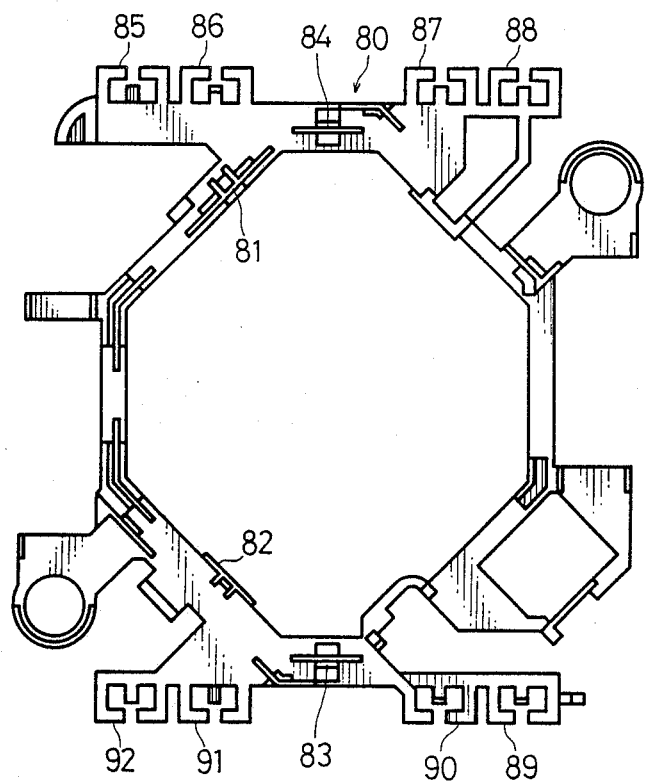
FIG. 36 is a plan view of an insert plate.
Figure 37:
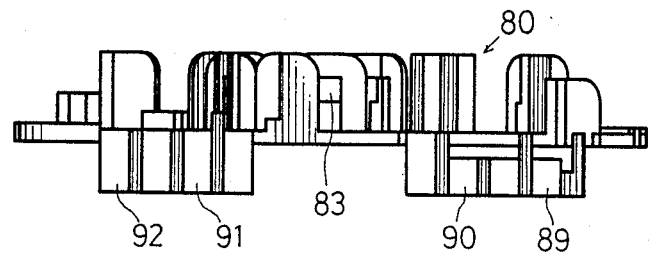
FIG. 37 is an end view of the insert plate of FIG. 36.
Figure 38:
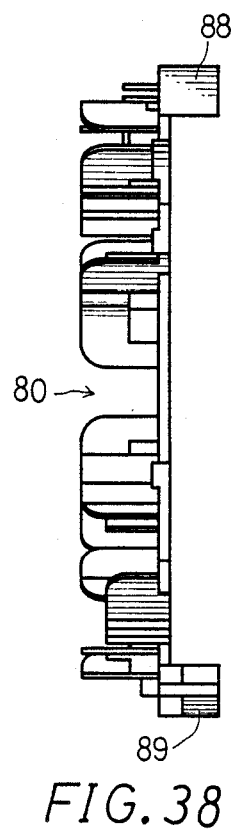
FIG. 38 is a right side view of the insert plate of FIG. 36.

Referring now to FIGS. 36, 37 and 38, shown therein is an insert plate 80 used to dispose the conductive plates 68, 70, 73, 75, 76, 77 and 78 in such a predetermined arrangement as shown in FIGS. 17 to 20 before molding the assembly base 14A of FIG. 47.

Figure 39:
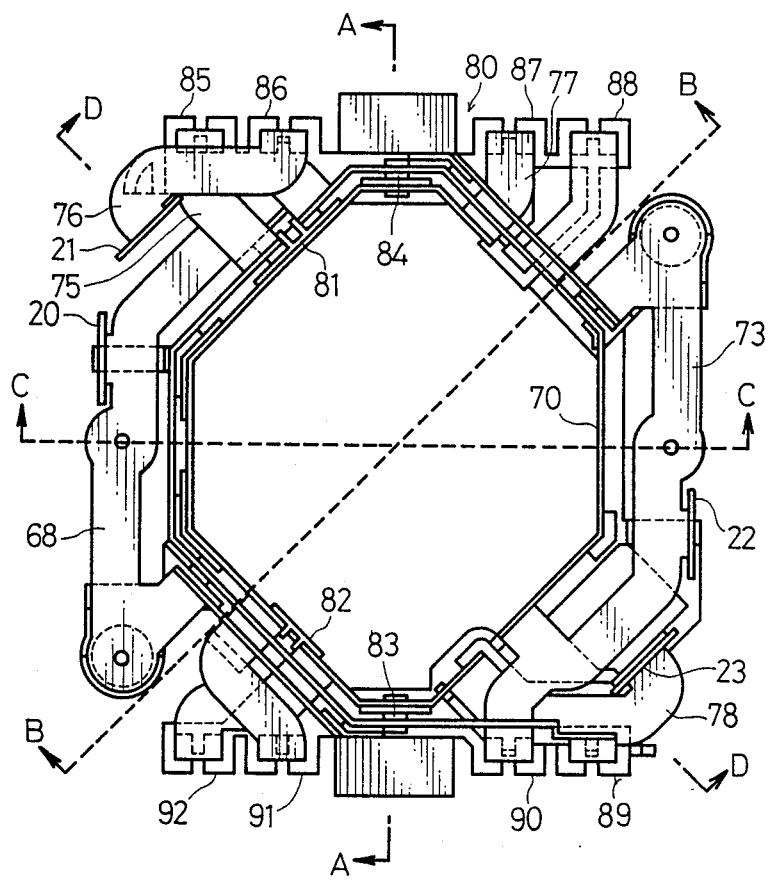
FIG. 39 is a plan view of the insert plate and the conductive plates mounted thereon.
Figure 40:
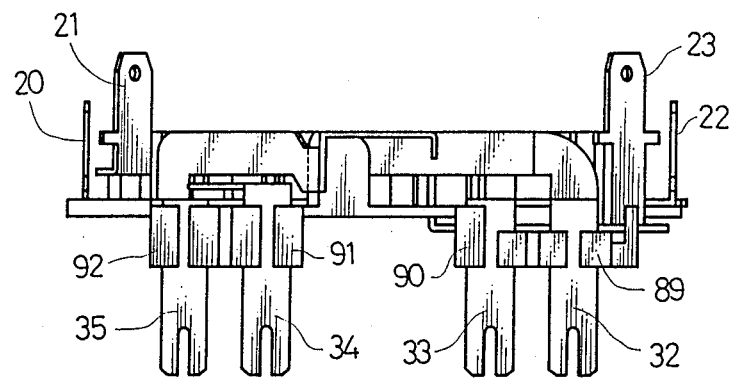
FIG. 40 is an end view of FIG. 39.
Figure 41:
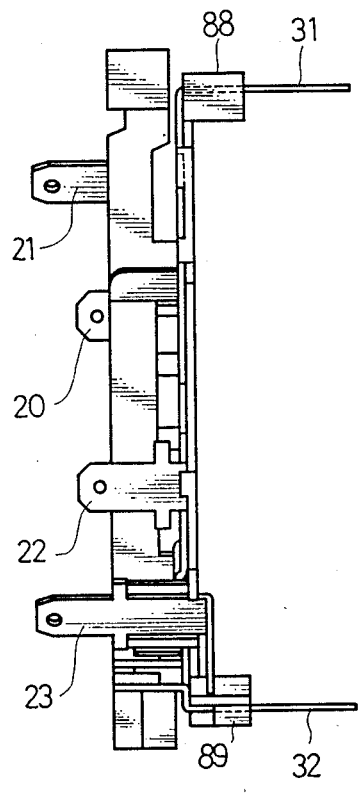
FIG. 41 is a right side view of FIG. 39.
Figure 42:
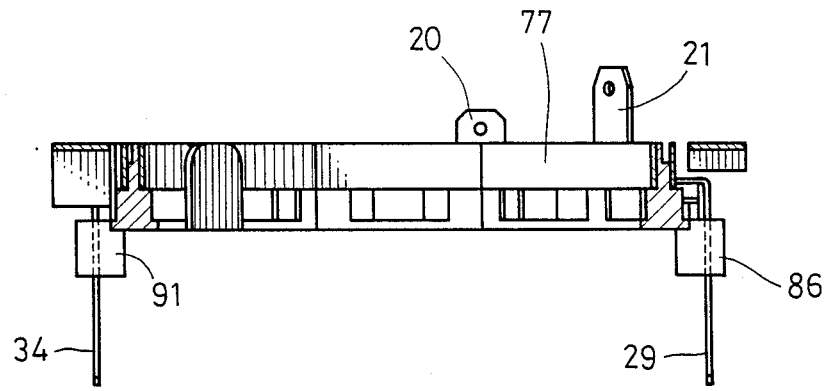
FIG. 42 is a sectional view taken along line A—A in FIG. 39.
Figure 43:
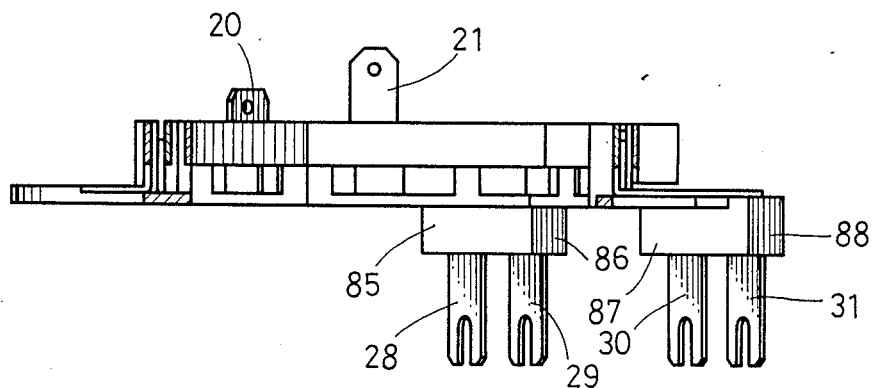
FIG. 43 is a sectional view taken along line B—B in FIG. 39.
Figure 44:
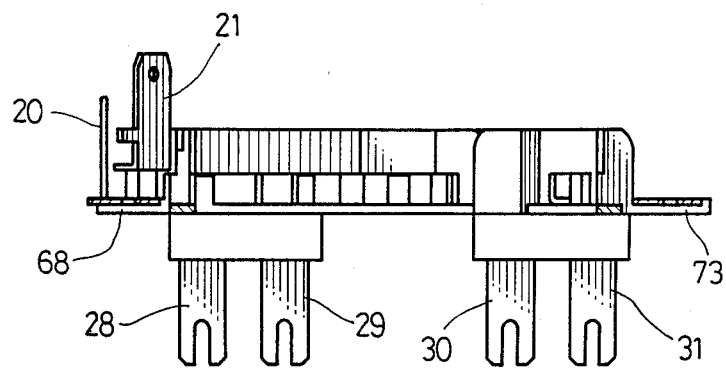
FIG. 44 is a sectional view taken along line C—C in FIG. 39.
Figure 45:
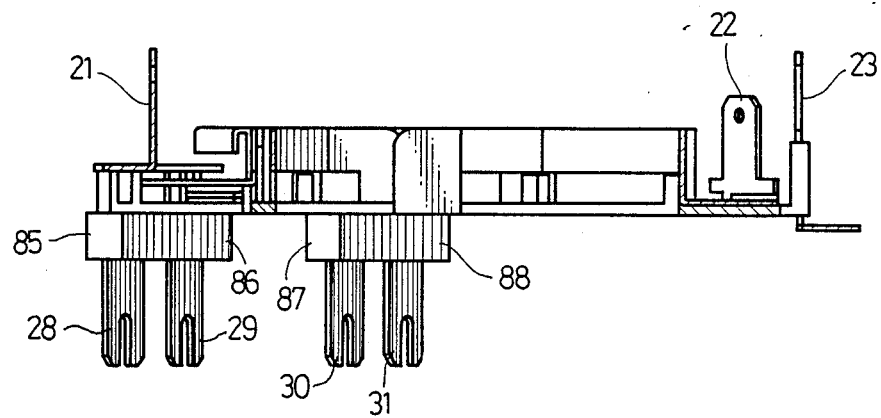
FIG. 45 is a sectional view taken along line D—D in FIG. 39.

The insert plate 80 is made of the same resin material as the base plate 15 and carries the conductive plates 68, 70, 73, 75, 76, 77 and 78 at predetermined positions as shown in FIGS. 39, 40 and 41 which are plan, end and right side views of such mounting of the conductive plates on the insert plate 80, respectively. For better understanding of the mounting of the conductive plates on the insert plate 80, sections taken along lines A—A, B—B, C—C and D—D in FIG. 39 are shown in FIGS. 42, 43, 44 and 45, respectively.

Figure 46:
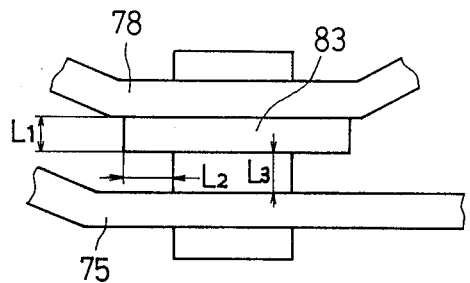
FIG. 46 is a schematic view illustrating the creeping distance between the conductive plates.

As may be seen in FIGS. 36 to 45, the insert plate 80 is provided with a guide block 81 to separate the conductive plates 70 and 75 for electrical isolation as well as to keep a space between the conductive plates 70, 75 and the conductive plate 77. The insert plate 80 is further provided with another guide block 82 to keep a space between the conductive plates 77 and 78, as well as to guide the conductive plates 77 and 78 in a stable manner. A stepped guide block 83 is provided to keep the creeping distance between the conductive plates 75 and 78 at a predetermined value, for example, 3 mm. The term of creeping distance means the distance between the conductive plates 75 and 78 measured along the surface of the stepped guide block 83. Specifically, in FIG. 46 showing the stepped guide block 83 and associated parts in a large scale, the creeping distance is the total of $L_1$, $L_2$, and $L_3$. The creeping distance is set to a predetermined value, 3 mm in this embodiment. It is considered that, with the difference of voltage between the conductive plates in this embodimnet, such a creeping distance of 3 mm between the conductive plates is sufficient to ensure electrical insulation, even if the space between the conductive plates is filled with air. In other words, the creeping distance of 3 mm is large enough to provide satisfactory insulating, even if the conductive plates are isolated from each other by air and not insulating material. In this embodiment, after mounting the conductive plates on the insert plate 80 as shown in FIG. 39, resin material is injected, to ensure reliable electrical insulation, and even if, for some reason, the space between the conductive plates has not been completely filled with the resin material and some voids of air are left, provision of the creeping distance of 3 mm assures electrical insulation. Another stepped guide block 84 is similarly provided to keep the creeping distance or the distance between the conductive plates 70 and 77 measured along the surface of the stepped guide block 81 at 3 mm. The insert plate 80 further includes integrally formed terminal retaining guides 85, 86, 87, 88, 89, 90, 91, 92 for receiving and retaining the terminals 28 to 35, respectively.

The insert plate 80 with the conductive plates 68, 70, 73, 75, 76, 77, 78 mounted thereon at predetermined positions as shown in FIGS. 39 to 45 is put in a mold (not shown) to be molded of resin material into an assembly base 14A as shown in FIG. 47. The brush holders 17A, 17B, choke coils 40L, 40R and other components may now be mounted on the assembly base 14A.

Figure 48:
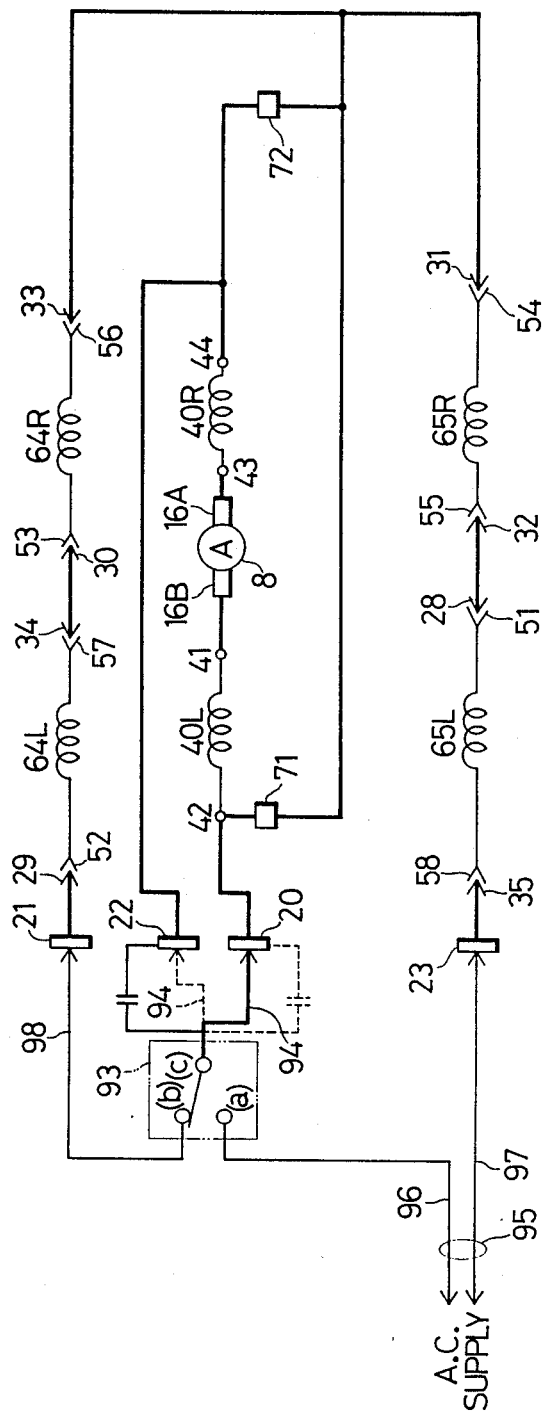
FIG. 48 is an electric circuit diagram of the first embodiment.

FIG. 48 shows an electric circuit diagram of the electric drill 1 incorporating the electric motor 2 with the braking system. The circuit includes the commutator 8, and the fixed terminals 20, 21, 22, 23 and the male terminals 28, 29, 30, 31, 32, 33, 34, 35 of the brush assembly 14. The circuit further includes the female terminals 51, 52, 53, 54, 55, 56, 57, 58 of the terminal board 9 for plug-in electrical connection with the male terminals 28, 29, 30, 31, 32, 33, 34, 35 of the brush assembly 14, respectively.

The circuit includes the brake coils 64L, 64R and the field coils 65L, 65R. The choke coils 40L, 40R are connected between the terminal holes 41 and 42 and between the terminal holes 43 and 44, respectively, and the conductive plates 68 and 73 are severed through the severing windows 45 and 46, respectively. Either one of the junction 71 between the respective end portions of the conductive plates 68 and 70 and the junction 72 between the respective end portions of the conductive plates 70 and 73 is severed to set the direction of rotation of the electric motor 2.

The electric motor 2 has a switch 93 which is turned on to connect contacts (a) and (c), when it is desired to supply driving current to the electric motor 2. In order to stop rotation of the electric motor 2, the switch 93 is turned off to connect contacts (c) and (b), so that the brake coils 64L, 64R may act as a kind of load to apply dynamic brake. A lead 94 connected with the contact (b) of the switch 93 is to be connected to either one of the fixed terminals 20 and 22. In case the junction 71 is severed, the lead 94 is connected to the fixed terminal 20, while, in case the junction 72 is severed, it is connected to the fixed terminal 22. A capacitor for suppressing radio noise may be connected between the other fixed terminal 20 or 22 out of use and the contact (c). A power cable 95 connected with an A.C. power source has one conductor 96 connected to the contact (a) of the switch 93 and the other conductor 97 connected through a junction terminal or the like (not shown) to the fixed terminal 23. The contact (b) of the switch 93 is connected through a lead 98 to the fixed terminal 21.

In the electric circuit of the above configuration with the junction 71 severed and the lead 94 connected to the fixed terminal 20, when the switch 93 is turned on, current from the A.C. power source flows in a loop composed in series of the conductor 96 of the power cable 95, the contact (a) of the switch 93, the contact (c) of the switch 93, the lead 94, the fixed terminal 20, the choke coil 40L, the brush 16B, the commutator 8, the rotor coils, the brush 16A, the choke coil 40R, the junction 72, the field coil 65R, the field coil 65L, the fixed terminal 23, and the conductor 97 of the power cable 95. The electric motor 2 is thus driven for rotation, for example, in the forward direction.

On the other hand, in the electric circuit with the junction 72 severed and the lead 94 connected to the fixed terminal 22, when the switch 93 is turned on, current from the A.C. power source flows in a loop composed in series of the conductor 96 of the power cable 95, the contact (a) of the switch, the contact (c) of the switch, the lead 94, the fixed terminal 22, the choke coil 40R, the brush 16A, the commutator 8, the rotor coils, the brush 16B, the choke coil 40L, the junction 71, the field coil 65R, the field coil 65L, the fixed terminal 23, and the conductor 97 of the power cable 95. In this loop, the direction of flow of current is reverse to that in the former loop and therefore, the electric motor 2 is driven for rotation in the reverse direction.

When the switch 93 is turned off to stop rotation of the electric motor 2 in the forward direction, the contact (b) of the switch 93 is connected with the contact (c) to complete a closed loop composed in series of the contact (c) of the switch 93, the contact (b) thereof, the lead 98, the fixed terminal 21, the brake coil 64L, the brake coil 64R, the junction 72, the choke coil 40R, the brush 16A, the commutator 8, the rotor coils, the brush 16B, the choke coil 40L, the fixed terminal 20, and the lead 94 from which current again flows to the contact (c) of the switch 93. The brake coils 64L and 64R act as load resistance to apply dynamic brake, so that the rotation of the electric motor 2 can be rapidly stopped. Similarly, during rotation in the reverse direction, brake is applied in the same manner. In this case, however, the junction 71 and the fixed terminal 22 constitute the closed loop.

Referring now to FIGS. 49 to 63, there is shown a second embodiment of the electric motor. The construction is similar to that of the first embodiment in that no brake coils are wound around the stator core and only field coils are employed. Reference numbers for components similar to those of the first embodiment will be employed, increased by 100, and their description will not be repeated.

Figure 49:
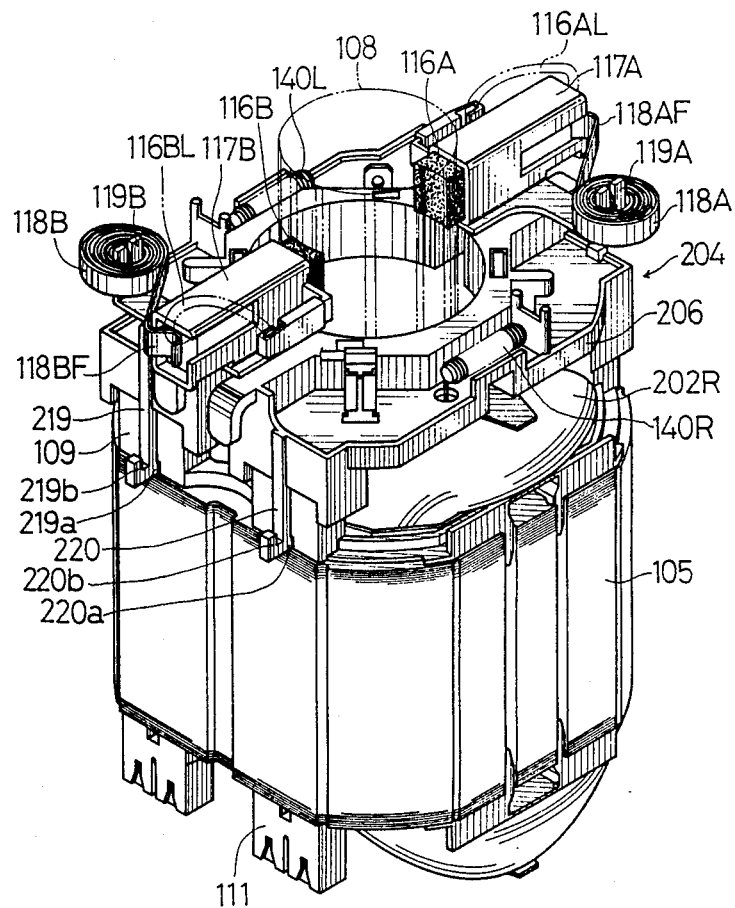
FIG. 49 is a perspective view of a brush assembly constructed in accordance with a second embodiment of the present invention, with the brush assembly fixedly connected to a terminal board which is attached to one end of a stator coil.

As shown in FIG. 49, a terminal board 109 formed of resin material and having the same construction as that of the first embodiment is mounted on the upper end face of a stator core 105 constructed in the same way as the first embodiment. The terminal board 109 serves as an insulating frame for each of stator coils 202L, 202R wound in two separate windings which will be described later and as means for connecting terminals as well as preventing deformation of the stator coils. As with the first embodiment, the terminal board 109 is provided with female terminals. Also as with the first embodiment, a similar terminal board 111 is mounted on the lower end face of the stator core 105.

A brush assembly 204 is mounted on the terminal board 109 and includes a base plate 206 formed of resin material. The base plate 206 is provided on the upper end face thereof with a pair of brush holders 117A, 117B which support a pair of brushes 116A, 116B, respectively. The brushes 116A, 116B are adapted to contact a commutator 108 for supplying electric power to rotor coils of the rotor and include brush leads 116AL, 116BL which are connected to the brush holders 117A, 117B, respectively. The brush holders 117A, 117B are provided with respective brush holder terminals 117AT, 117BT. As with the first embodiment, a pair of brush springs 118A, 118B in the form of coils formed of a flat spring material are supported on the upper end face of the base plate 206 by brush spring holders 119A, 119B. The brush springs 118A, 118B have distal ends 118AF, 118BF adapted to abut against the rear end faces of the brushes 116A, 116B to urge them from backside, respectively.

Also as with the first embodiment, the brush springs 118A, 118B are adapted to hold the brushes 116A, 116B away from the commutator 108 with the distal ends 118AF, 118BF in abutment against the side faces of the brushes 116A, 116B.

Figure 50:
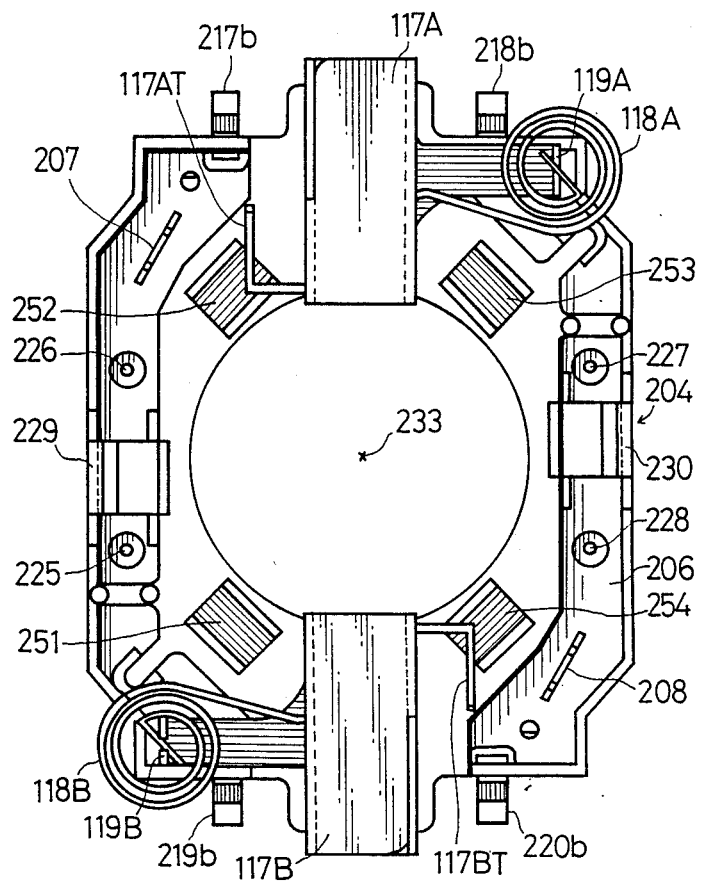
FIG. 50 is a plan view of the brush assembly shown in FIG. 49.
Figure 51:
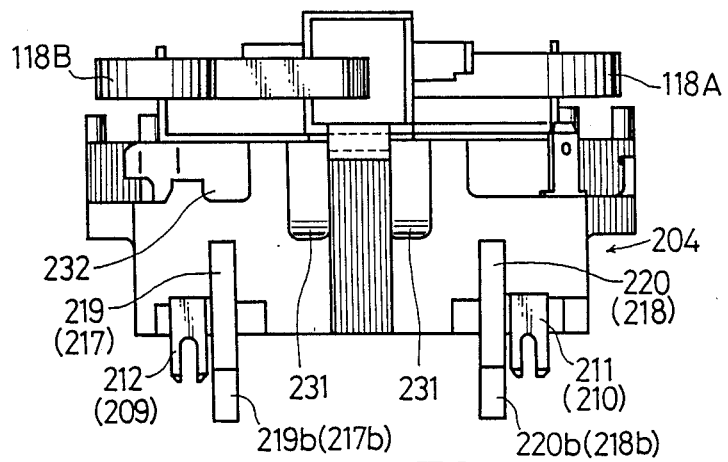
FIG. 51 is an end view of the brush assembly of FIG. 50.
Figure 52:
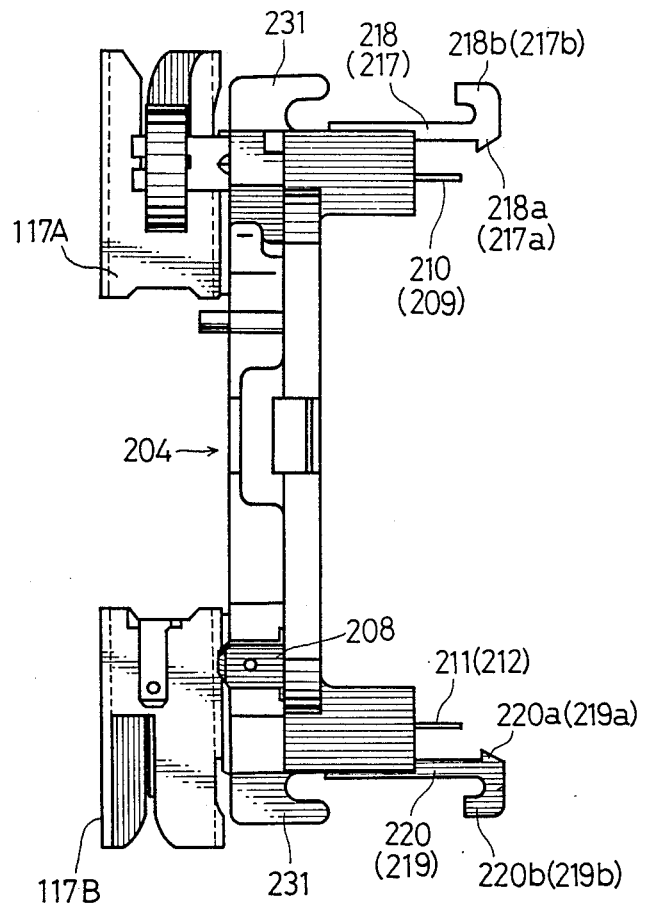
FIG. 52 is a right side view of the brush assembly of FIG. 50.

Further details of the brush assembly 204 are shown in FIGS. 50, 51 and 52. As shown therein, the brush assembly 204 is provided with fixed male terminals 207, 208 for plug-in connection with female terminals connected to respective ends of leads which are, in turn, connected to a switch or the like of the electric drill. The fixed terminals 207, 208 extend upwardly from the base plate 206 and are formed on end portions of conductive plates which will be described later.

The base plate 206 is provided on the lower end face thereof with flat male terminals 209, 210, 211, 212 for plug-in electrical connection with crimp or female terminals 151, 154, 155, 158 provided on the terminal board 109 which are the same as those in the first embodiment. The male terminals 209 to 212 are formed on end portions of conductive plates which will be described later, and the other portions of the conductive plates are embedded in the resin portion of the base plate 206.

The base plate 206 is also provided with four locking pieces 217, 218, 219, 220 extending downwardly from the lower end face of the base plate 206 and having at respective lower ends locking pawls 217a, 218a, 219a, 220a. As shown in FIG. 49, the locking pawls 217a to 220a are adapted to be engaged with slots formed in the terminal board 109 to positively lock the brush assembly 204 to the terminal board 109. The locking pieces 217 to 220 have detaching hooks 217b to 220b extending outwardly from the lower ends thereof and adapted to be pulled out to disengage the locking pawls 217a to 220a from the slots.

The base plate 206 is further provided on the upper face thereof with two pairs of terminal holes 225, 226 and 227, 228 to be connected to choke coils 140L, 140R (FIG. 49) for suppressing noise produced at connections between the commutator 108 and the brushes 116A, 116B. There are short across the terminal holes 225 and 226 and across the terminal holes 227 and 228 caused by the conductive plates which will be described later. Thus, when the choke coils 140L, 140R are connected between the terminal holes 225 and 226 and between the terminal holes 227 and 228, the conductive plates are severed through severing windows 229, 230, so that driving current may flow through the choke coils 140L, 140R to the rotor coils.

As with the first embodiment, a plurality of small lead guide members 231 extend downwardly from the upper end face of the base plate 206 so as to guide, for example, a lead connected to the fixed terminal 208 to extend along the outer periphery of the base plate 206 without projecting outwardly. A plurality of lead guide holes 232 formed in the outer peripheral portion of the base plate 206 for passing the leads guided by the lead guide members 231 therethrough.

The base plate 206 has a circular aperture 233 for receiving the commutator 108 with a required clearance left therebetween.

Figure 53:
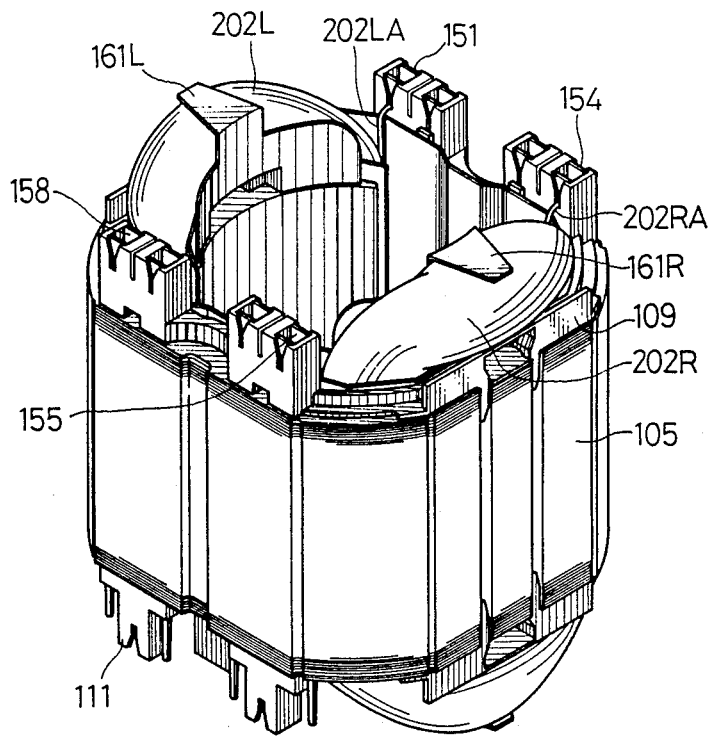
FIG. 53 is a perspective view of the stator core and the terminal board attached to the end face of the stator core showing connection of ends of the stator coils to crimp terminals of the terminal board.

As shown in FIG. 53, the terminal board 109 is provided with a plurality of female terminals 151, 154, 155, 158 connected with respective ends of the stator coils 202L, 202R. The terminal board 109 is also provided with integrally formed coil support frames 161L, 161R for preventing deformation of the stator coils 202L, 202R. The stator coil 202L has a starting end 202LA connected to the terminal 151 of the terminal board 109 and a terminating end 202LB connected to the terminal 158. The stator coil 202R has a starting end 202RA connected to the terminal 154 of the terminal mounting board 109 and a terminating end 202RB connected to the terminal 155.

Figure 54:
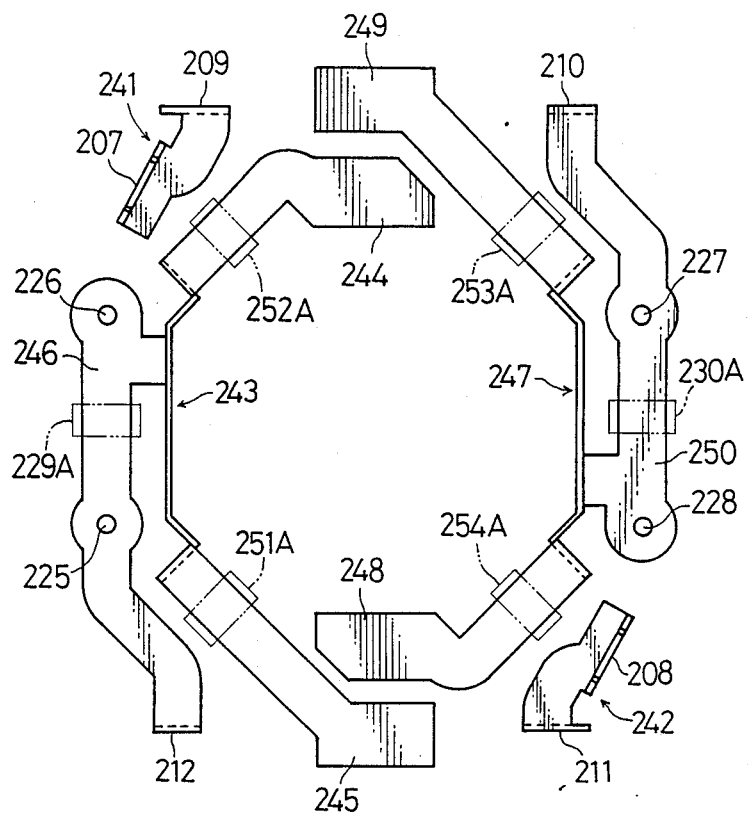
FIG. 54 is a view illustrating arrangement of conductive plates in the brush assembly.
Figure 55:
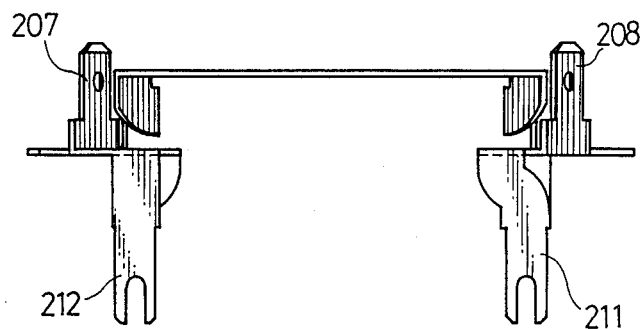
FIG. 55 is an end view of FIG. 54.
Figure 56:
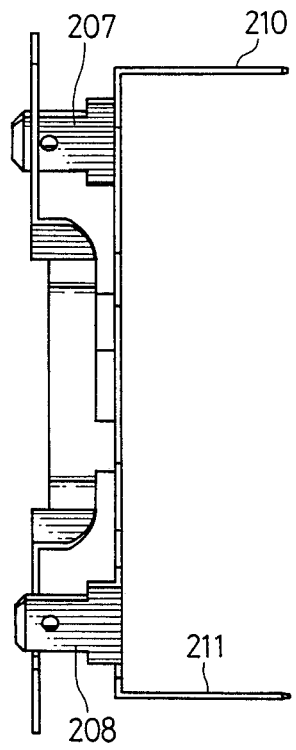
FIG. 56 is a right side view of FIG. 54.
Figure 57:
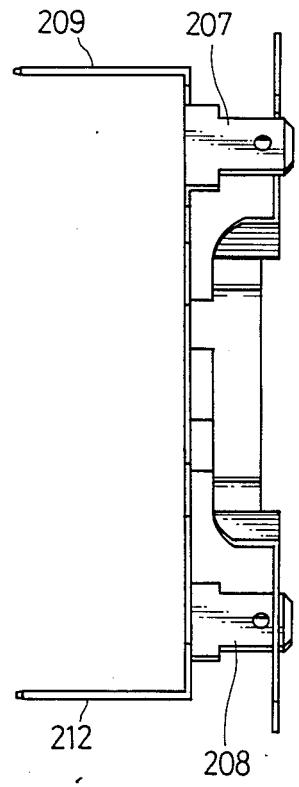
FIG. 57 is a left side view of FIG. 54.

The arrangement of the conductive plates embedded in the base plate 206 will now be described with reference to FIGS. 54, 55, 56 and 57. FIG. 54 is a plan view of the arrangement of the conductive plates provided with fixed terminals 207, 208 and the terminals 209 to 212 and embedded in the base plate 206 with required spaces left between the respective conductive plates. FIG. 55 is an view of FIG. 54; FIG. 56 is a right side view of FIG. 54; and FIG. 57 is a left side view of FIG. 54.

As will be seen in FIGS. 54 to 57, the arrangement of the conductive plates incorporated in the base plate 206 is composed of conductive plates 241, 242, 246 and 247. The conductive plate 241 has one end portion formed with the fixed terminal 207 and the other end portion formed with the terminal 209. The conductive plate 242 is disposed symmetrically with respect to the conductive plate 241 and has one end portion formed with the fixed terminal 208 and the other end portion formed with the terminal 211. The conductive plate 243 has one end portion constituting a portion 244 to be electrically and mechanically connected with the brush holder 117A and the other end portion constituting a portion 245 to be electrically and mechanically connected with the brush holder 117B. The conductive plate 243 is provided with a branch 246 extending from an intermediate portion of the conductive plate 243 and having an intermediate portion formed with the terminal holes 225, 226 between which the choke coil 140L is to be connected and a distal end portion formed with the terminal 121. The conductive plate 247 is disposed symmetrically with respect to the conductive plate 243 and has one end portion constituting a portion 248 to be electrically and mechanically connected with the brush holder 117B and the other end portion constituting a portion 249 to be electrically and mechanically connected with the brush holder 117A. The conductive plate 247 is provided with a branch 250 extending from an intermediate portion of the conductive plate 247 and having an intermediate portion formed with the terminal holes 227, 228 between which the choke coil 140R is to be connected and a distal end portion formed with the terminal 210.

As shown in FIG. 50, the base plate 206 has further severing windows 251, 252, 253 and 254 in addition to the aforementioned severing windows 229 and 230. As shown in FIG. 54, the conductive plate 243 has severable portions 251A and 252A exposed through the severing windows 251 and 252, and the conductive plate 247 has severable portions 253A and 254A exposed through the severing windows 253 and 254. With this construction, an electric circuit is produced in such a manner that severing, for example, of the severable portions 252A and 254A may cause rotation of the electric motor in the opposite direction to that caused by severing of the severable portions 251A and 253A.

As shown in FIG. 54, the conductive plate 243 has a severable portion 229A exposed through the severing window 229, and the conductive plate 247 has a severable portion 230A exposed through the severing window 230. The choke coils 140L and 140R can be connected between the corresponding terminal holes, after the severable portions 229A and 230A are severed.

Figure 58:
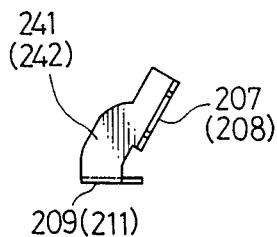
FIG. 58 is a plan view of the conductive plate 241 (242) shown in FIG. 54.
Figure 59:
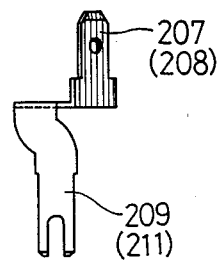
FIG. 59 is an end view of FIG. 58.
Figure 60:
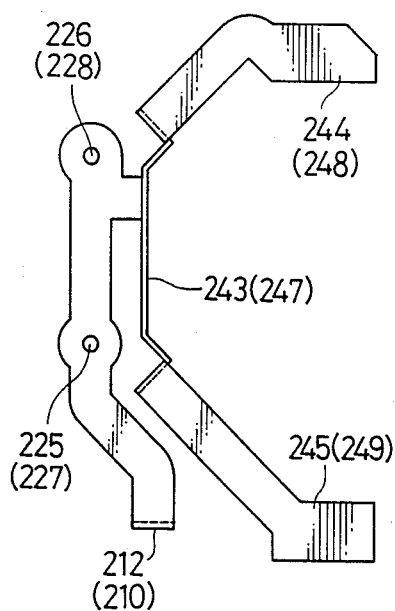
FIG. 60 is a plan view of the conductive plate 243 (247) shown in FIG. 54.
Figure 62:
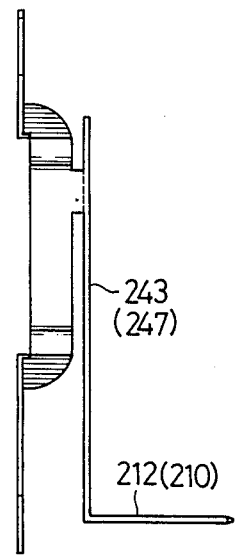
FIG. 62 is a right side view of FIG. 60.
Figure 61:
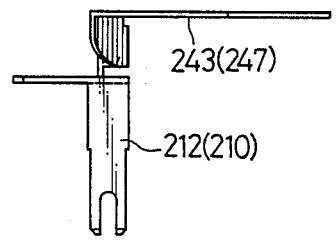
FIG. 61 is an end view of FIG. 60.

The conductive plates 241, 242, 243, 247 are shown separately in FIGS. 58 to 62. FIGS. 58 and 59 are plan and end views of the conductive plates 241 (242), respectively. FIGS. 60, 61 and 62 are plan, end and right side views of the conductive plates 243 (247), respectively.

Figure 63:
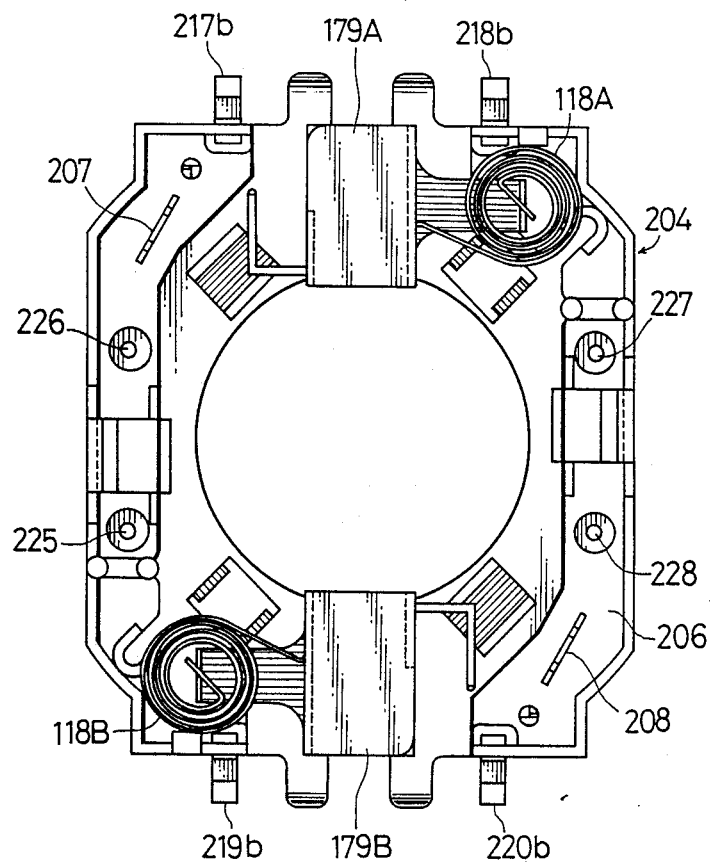
FIG. 63 is a plan view of the brush assembly carrying shorter brushes.

FIG. 63 shows a pair of brush holders 179A, 179B of a length shorter than the brush holders 117A, 117B which are mounted on the base plate 206. Thus, as with the first embodiment, various sizes of brushes or brush holders may be mounted on the base plate 206 according to the present invention.

Figure 64:
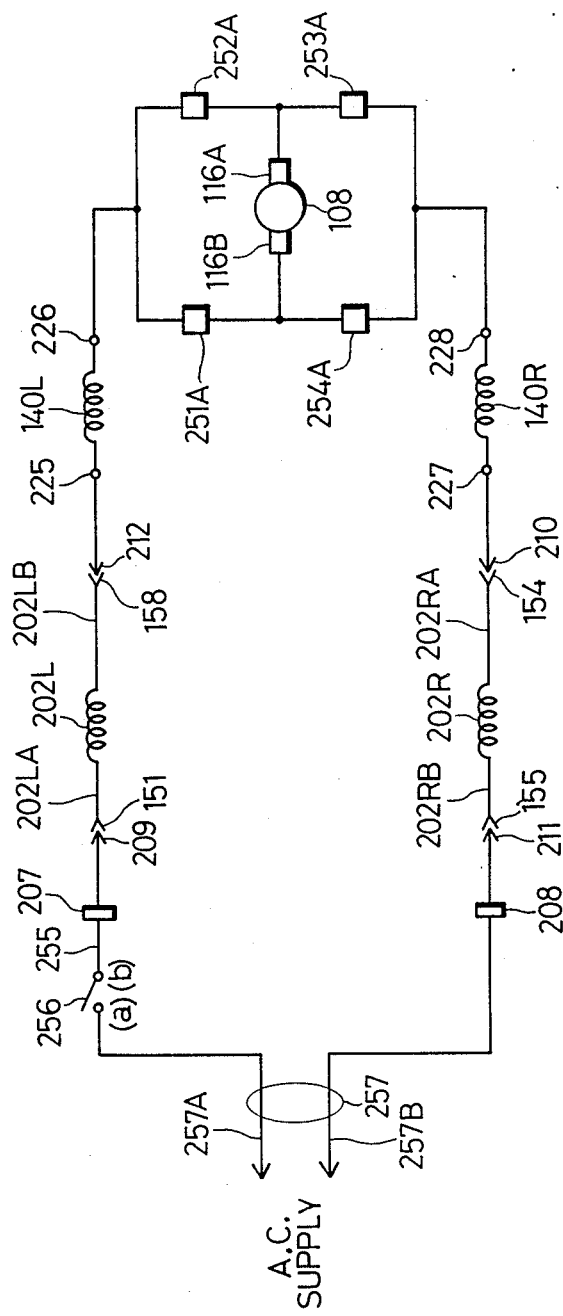
FIG. 64 is an electric circuit diagram of the second embodiment.

FIG. 64 shows an electric circuit of the second embodiment, including the fixed terminals 207 and 208. The fixed terminal 207 is connected through a lead 255 to a contact (b) of a switch 256 which has the other contact (a) connected to a conductor 257A of a power cable 257. The fixed terminal 208 is connected through a junction terminal (not shown) to the other conductor 257B of the power cable 257. The circuit further includes the female terminals 151, 154, 155 and 158 of the terminal board 109 for plug-in connection with the male terminals 209, 210, 211 and 212 of the brush assembly 204, respectively. The choke coils 140L and 140R are connected between the terminal holes 225 and 226 and between the terminal holes 227 and 228, respectively, and the stator coils 202L and 202R are connected in the circuit.

Further, the severable portions 251A, 252A, 253A and 254A are connected in the circuit, and when the electric motor is to be driven for rotation, for example, in the forward direction, the severable portions 252A and 254A are severed, while, when the electric motor is to be rotated in the reverse direction, the severable portions 251A and 253A are severed.

In the electric circuit of the above configuration with the severable portions 252A and 254A severed, when the switch 256 is turned on, driving current from an A.C. power source flows in a loop composed in series of the conductor 257A of the power cable 257, the switch 256, the lead 255, the fixed terminal 207, the stator coil 202L, the choke coil 140L, the severable portion 251A, the brush 116B, the commutator 108, the rotor coils, the brush 116A, the severable portion 253A, the choke coil 140R, the stator coil 202R, the fixed terminal 208 and the conductor 257B to rotate the electric motor.

In the electric circuit with the severable portions 251A and 253A severed, when the switch 256 is turned on, the direction of current flow through the commutator 108 to the stator coils is opposite to that of the circuit with the severable portions 252A and 254A severed, causing the electric motor to rotate in the opposite direction.

While the invention has been described with reference to preferred embodiments thereof, it is to be understood that modifications or variations may be easily made without departing from the spirit of the present invention which is defined by the appended claims.

What is claimed is:

1. An electric motor comprising:
a commutator; and
a brush assembly including
a pair of brushes each disposed in operative relation to said commutator,
a pair of brush holders each supporting at least one of said brushes, and
an assembly base for securing said brush holders thereto, said assembly base including a base plate of insulating material and at least two severable conductive passages each secured to said base plate, said conductive passages being adapted to supply electric current to said pair of brushes from different directions and drive said electric motor for rotation in either forward or reverse direction when either one of said passages is severed.

2. The electric motor as defined in claim 1 wherein said conductive passages are formed of conductive plates and are embedded in said base plate.

3. The electric motor as defined in claim 2 wherein each of said conductive plates has a portion exposed on one surface of said base plate for electrical connection to each of said brushes.

4. The electric motor as defined in claim 3 wherein said pair of brushes each has a lead wire connected thereto, said lead wire having a terminal electrically connected to said portion of said conductive plate exposed on one surface of said base plate.

5. The electric motor as defined in claim 2 wherein said conductive plates have portions projecting from said base plate for electrical connection to terminals of lead wires from a power source or a switch.

6. The electric motor as defined in claim 2 wherein said conductive plates have portions projecting from said base plate for electrical connection to terminals of stator coils.

7. The electric motor as defined in claim 6 further comprising a stator having a terminal board, said terminal board having terminals for electrical connection to ends of the stator coils, said terminals being electrically connected to said conductive passages of said base plate when said assembly base is mounted on said terminal board.

8. The electric motor as defined in claim 7 wherein said assembly base and said terminal board include means for retaining said assembly base on said terminal board.

9. An electric motor comprising:
a switch (93) having contact (a, b, c);
a power cable having a first and a second conductor (96, 97);
a commutator;
a stator including a stator core, a first and a second field coil (65L, 65R), a first and a second brake coil (64L, 64R), and a terminal board mounted on one end face of said stator core, said terminal board having a first and a second terminal (58, 51) for connection to ends of said first field coil (65L), a third and fourth terminal (55, 54) for connection to ends of said second field coil (65R), a fifth and a sixth terminal (56, 53) for connection to said second brake coil (64R), and a seventh and an eighth terminal (57, 52) for connection to said first brake coil (64L); and a brush assembly including
- a pair of brushes (16A, 16B) each disposed in operative relation to said commutator,
- a pair of brush holders each supporting at least one of said brushes, and
- an assembly base for securing said brush holders thereto, said assembly base including a base plate of insulating material and a plurality of conductive passages secured to said base plate, said plurality of conductive passages comprising a first conductive passage connecting said second conductor (97) to said first terminal (58), a second conductive passage connecting said second terminal (51) to said third terminal (55), a third conductive passage connecting said fourth terminal (54) to said fifth terminal (56), a fourth conductive passage connecting said sixth terminal (53) to said seventh terminal (57), a fifth conductive passage connecting said eighth terminal (52) to said contact (b) of said switch (93) in its inoperative position, a sixth conductive passage connecting said first conductor (96) to one of said brushes (16A, 16B) through said switch (93), and a seventh conductive passage connecting the other of said brushes (16A, 16B) to said fourth terminal (54);

whereby electrical connection of said stator is effected on only one end of said stator.

10. The electric motor as defined in claim 9 wherein said conductive passages are formed of conductive plates and are embedded in said base plate.

11. The electric motor as defined in claim 10 wherein each of said conductive plates has a portion exposed on one surface of said base plate for electrical connection to each of said brushes.

12. The electric motor as defined in claim 11 wherein said pair of brushes each has a lead wire connected thereto, said lead wire having a terminal electrically connected to said portion of said conductive plate exposed on one surface of said base plate.

13. The electric motor as defined in claim 10 wherein said conductive plates have portions projecting from said base plate for electrical connection to terminals of lead wires from a power source or a switch.

14. The electric motor as defined in claim 10 wherein said conductive plates have portions projecting from said base plate for electrical connection to terminals of said field coils and brake coils.

15. The electric motor as defined in claim 14 wherein said conductive passages are connected to the terminals of said field coils and brake coils when said assembly base is mounted on said terminal board.

16. The electric motor as defined in claim 15 wherein said assembly base and said terminal board include means for retaining said assembly base on said terminal board.

17. The electric motor as defined in claim 10 wherein said plurality of conductive passages are multi-layered and electrically insulated from each other.

18. The electric motor as defined in claim 17 wherein said conductive passages are insulated by stepped guide blocks.

* * * * *